United States Patent [19]
Shinogi et al.

[11] Patent Number: 6,005,275
[45] Date of Patent: Dec. 21, 1999

[54] SEMICONDUCTOR ACCELERATION SENSOR WITH CANTILEVER

[75] Inventors: Masataka Shinogi; Yutaka Saitoh; Yoshifumi Yoshida; Hirofumi Harada; Kenji Katoh, all of Chiba, Japan

[73] Assignee: Seiko Instruments Inc., Japan

[21] Appl. No.: 08/518,790

[22] Filed: Aug. 23, 1995

[30] Foreign Application Priority Data

| Aug. 29, 1994 | [JP] | Japan | 6-204032 |
| Sep. 2, 1994 | [JP] | Japan | 6-210208 |
| Nov. 21, 1994 | [JP] | Japan | 6-286960 |
| Dec. 9, 1994 | [JP] | Japan | 6-306625 |
| Dec. 28, 1994 | [JP] | Japan | 6-328253 |
| Jul. 20, 1995 | [JP] | Japan | 7-183784 |

[51] Int. Cl.$^6$ ............................................. H01L 29/82
[52] U.S. Cl. .................. 257/417; 257/418; 257/419; 257/420; 257/619; 73/514.21; 73/514.22; 73/514.23; 73/514.36; 73/514.37; 73/DIG. 1
[58] Field of Search ................... 257/619, 417, 257/418, 419, 420; 73/514.21, 514.22, 514.23, 514.36, 514.37, DIG. 1

[56] References Cited

U.S. PATENT DOCUMENTS

| 3,304,787 | 2/1967 | Chiku et al. | 73/517 |
| 4,025,942 | 5/1977 | Kurtz | 357/26 |
| 4,141,253 | 2/1979 | Whitehead, Jr. | 73/727 |
| 4,494,409 | 1/1985 | Kondo et al. | 73/651 |
| 4,881,408 | 11/1989 | Hulsing, II et al. | 73/517 AV |
| 4,963,954 | 10/1990 | Hale et al. | 257/418 |
| 4,969,359 | 11/1990 | Mikkor | 73/517 R |
| 5,060,504 | 10/1991 | White et al. | 73/514.37 |
| 5,101,669 | 4/1992 | Holm-Kennedy et al. | 73/862.64 |
| 5,151,763 | 9/1992 | Marek et al. | 357/26 |
| 5,202,281 | 4/1993 | Ishibashi | 437/51 |
| 5,313,836 | 5/1994 | Fujii et al. | 73/517 R |
| 5,536,963 | 7/1996 | Polla | 257/418 X |

FOREIGN PATENT DOCUMENTS

| 102069A2 | 3/1984 | European Pat. Off. . |
| 333091A2 | 9/1989 | European Pat. Off. . |
| 534366A1 | 3/1993 | European Pat. Off. . |
| 414588A1 | 2/1991 | France . |
| 4316279 | 11/1993 | Germany . |
| 4344284 | 6/1994 | Germany . |

OTHER PUBLICATIONS

No Author, "Double Cantilever Sensor for Thin–Film Hardness Testing and Mass Storage Application", *IBM Technical Disclosure Bulletin*, vol. 34, No. 10A, Mar. 1992, pp. 194–195.
IEEE Ultrasonic Symposium, Oct. 31, 1993, pp. 341–350, Najafi et al., "Solid–State Microsensors and Smart Structures".

*Primary Examiner*—William Mintel
*Attorney, Agent, or Firm*—Adams & Wilks

[57] ABSTRACT

A semiconductor device comprises a semiconductor acceleration sensor having a cantilever made of a semiconductor material, a supporter for supporting the cantilever, and diffused resistors disposed on the cantilever. An acceleration detecting device detects a displacement of the cantilever based on acceleration forces applied to the cantilever and on changes of resistance values of the diffused resistors.

35 Claims, 40 Drawing Sheets

FIG. 11
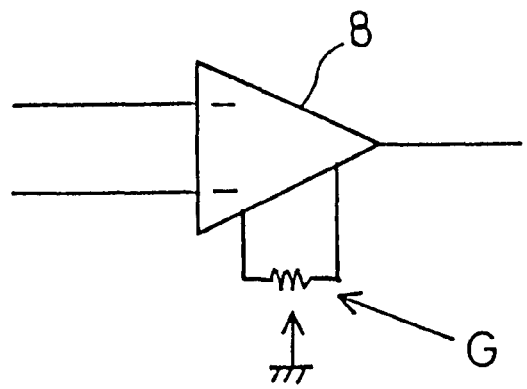
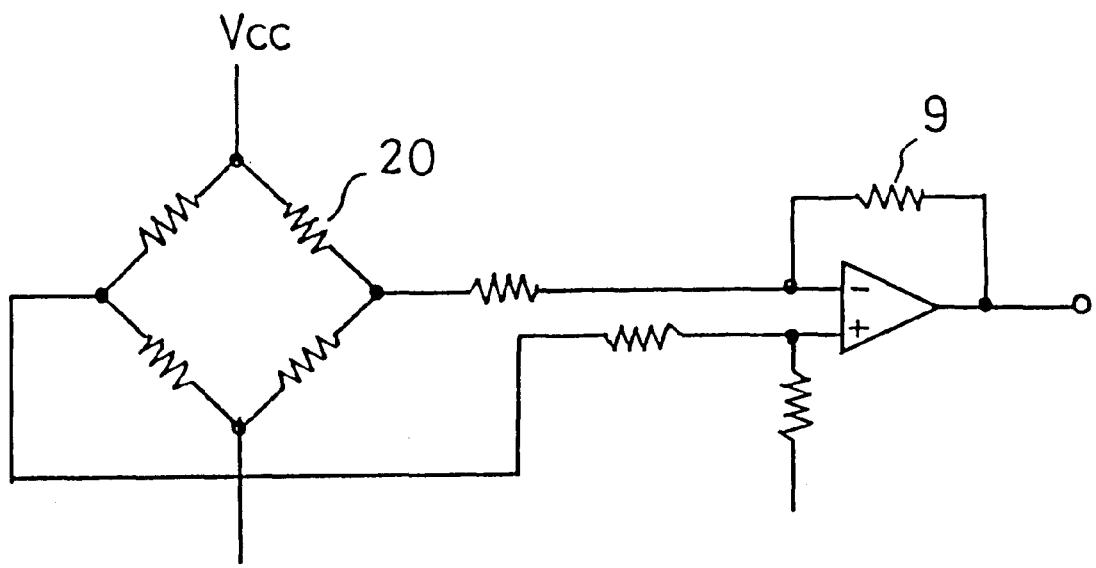
FIG. 12

F I G. 2 3
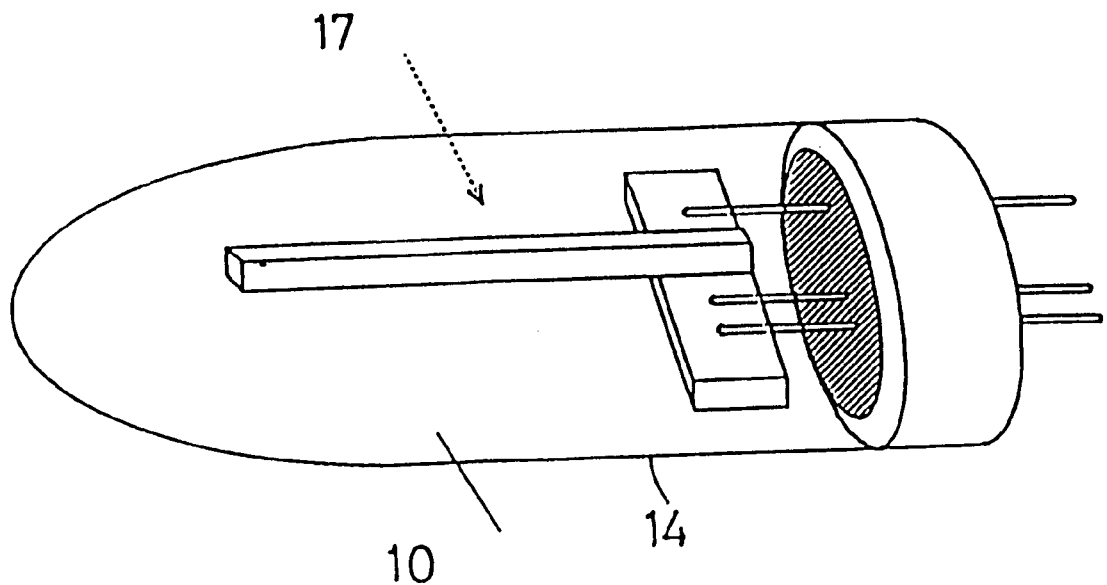

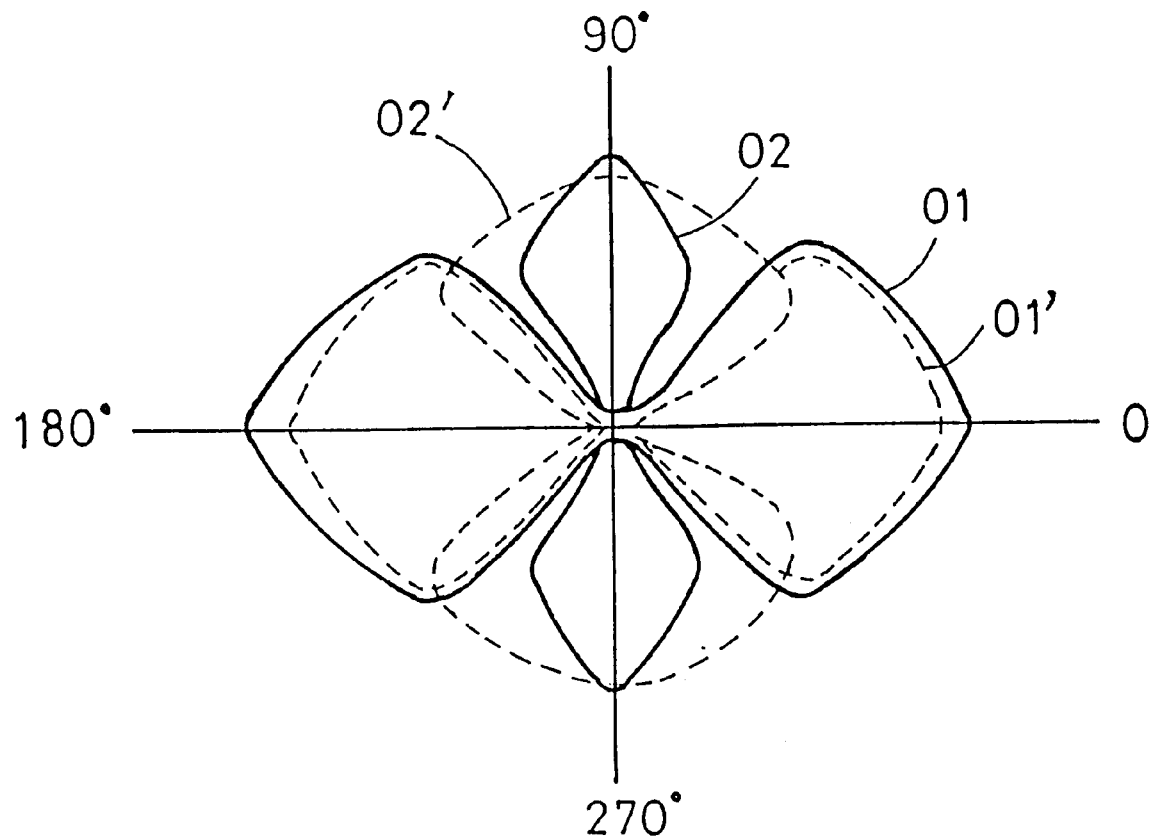
FIG. 52
FIG. 53
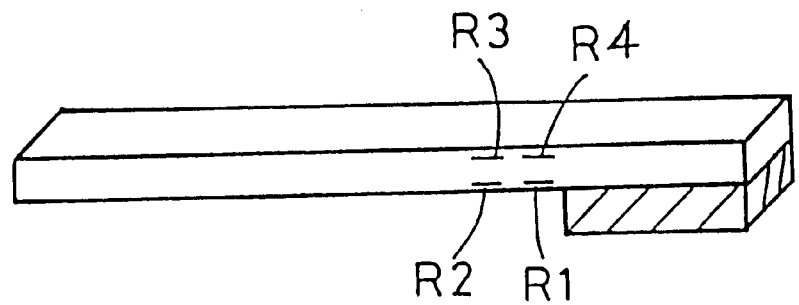

FIG. 61 PRIOR ART
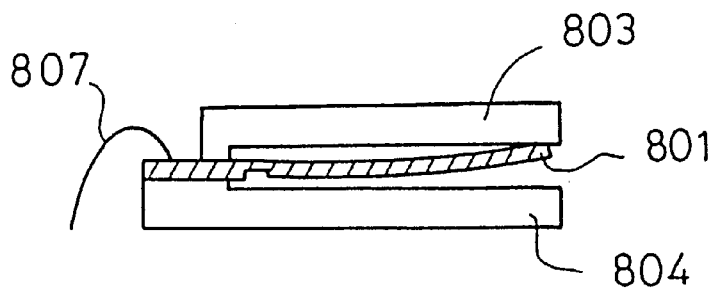
FIG. 62 PRIOR ART
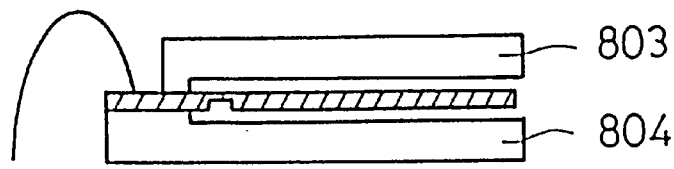
FIG. 63 PRIOR ART
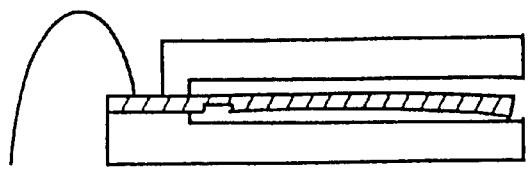
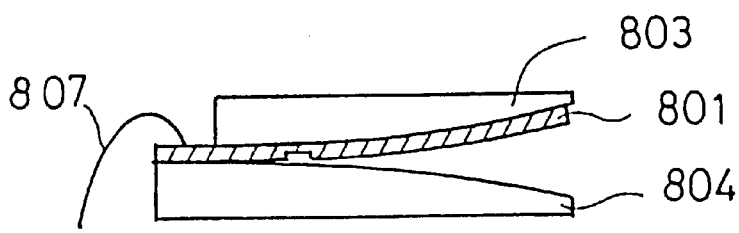
FIG. 64
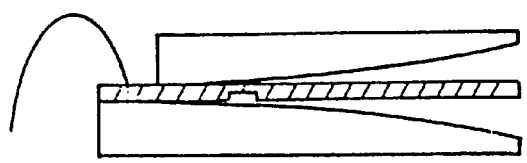
FIG. 65
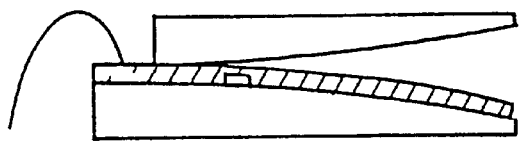
FIG. 66

FIG. 71A
FIG. 71D
FIG. 71B
FIG. 71E
FIG. 71C
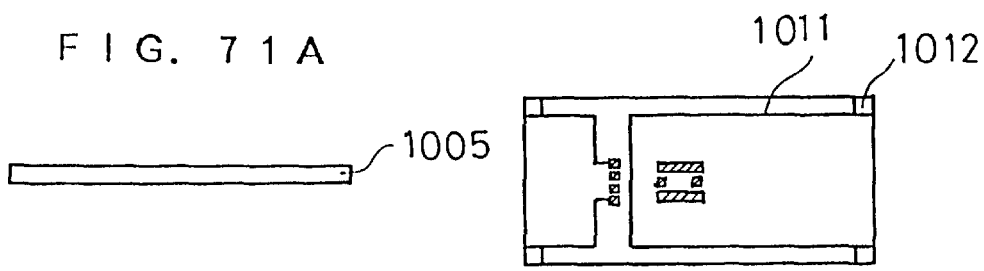
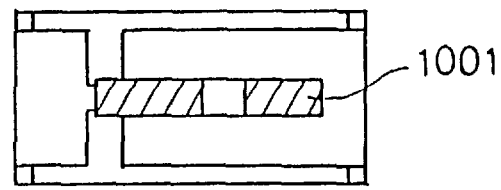
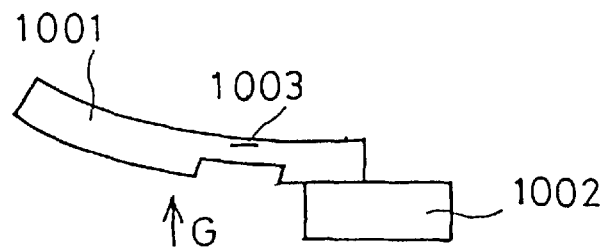
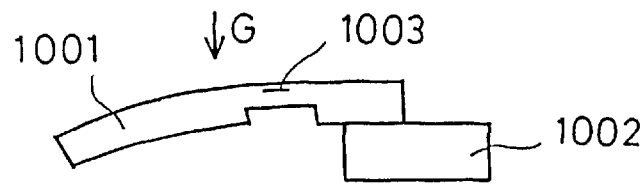
FIG. 72A PRIOR ART
FIG. 72B PRIOR ART

SEMICONDUCTOR ACCELERATION SENSOR WITH CANTILEVER

BACKGROUND OF THE INVENTION

The present invention relates to a semiconductor device and to an acceleration sensor and pressure sensor in particular for converting a displacement into an electrical signal by utilizing a piezo-resistance effect of a semiconductor crystal such as silicon.

With the recent development of micro-machining technology, it has become possible to form semiconductor acceleration sensors on a semiconductor substrate by forming and etching a thin film. An acceleration sensor fabricated typically by micro-machining is described in L. M. ROYLANCE, J. B. Angell: IEEE Transactions on Electron Devices, Vol. ED-26, No. 12, December 1979, for example. Micro-machining allows to thin a thickness of a diffused resistor section for chemically detecting a displacement to facilitate it to displace. According to Japanese Patent Laid-Open No. Hei. 1-302167, it is said that a diffused resistor section has been thinned by means of isotropic etching to enhance its sensitivity. FIG. 6 shows a prior art example of a semiconductor acceleration sensor. This prior art example requires a protection film 21 for protecting the surface wiring to thin the diffused resistance section by means of the isotropic etching.

Further, in order to prevent a destruction of the thin section, stoppers 1008 and 1009 for restricting a deformation shown in FIG. 70 have been used.

Next, a prior art technology of a semiconductor pressure sensor will be explained. Hitherto, there has been known a semiconductor pressure sensor in which a base 705 made from glass on which a base 702 made from silicon is bonded and a terminal 707 are adhered on a support base made from ceramics and the base 702 is connected with the terminal 707 by a wire 709 as shown in FIG. 34. Such a structure has been disclosed in "Electronics" 29, 6(1984) 17 for example. A pressure reference chamber 703 is provided and a diaphragm 704 is formed thereon also in such a prior art example.

Further, a micro-pressure sensor having a square diaphragm 704 having a side of 80 $\mu$m has been made in trial by applying the micro-machining technology. This pressure sensor is characterized in that the diaphragm 704 and the pressure reference chamber are formed by etching from the surface of the silicon substrate 702. FIG. 35 shows a diagrammatic drawing showing a sectional structure of the pressure sensor fabricated by the micro-machining. Silicon of (100) face is used for the substrate and the diaphragm 704 is coated by a $Si_3N_4$ film 713. Etching holes are bored around the diaphragm 704 and the right under the diaphragm is hollowed out to form a cavity. The etching holes are then sealed by the $Si_3N_4$ film 713. In a case of the acceleration sensor, stoppers are used to prevent an excessive displacement as a measure for enhancing a shock resistance.

FIG. 60 shows a section view of the prior art semiconductor acceleration sensor. In FIG. 60, the semiconductor acceleration sensor comprises a cantilever 8102 formed by means of etching and a weight 8103 which is a mass section on a silicon base 8101, and diffused resistors for converting an acceleration into an electrical signal are formed on the cantilever 8102. An upper stopper 8105 and a lower stopper 8106 for preventing a destruction of the cantilever which may be caused when an excessive acceleration is applied are structured on and below the silicon base 8101.

When an acceleration is added to the acceleration sensor from a direction shown in the figure, i.e. from the top to the bottom of the figure, the cantilever 8102 deflects and resistances value of the diffused resistors change by the stress. The acceleration sensor detects the acceleration by taking out that variation.

However, the prior art semiconductor acceleration sensor of the semiconductor device fabricated by the micro-machining technology and the method of enhancing the sensitivity by thinning the diffused resistor section by means of etching have had the following problems:

1) A process for protecting other wiring and the like is required in order to perform etching to thin a displacement detecting section;

2) A manufacturing process is prolonged due to a lithographic process such as an application of resist;

3) An etching time and a thickness of the displacement detecting section vary considerably depending on a condition of an etchant because of a wet type process;

4) Its shock resistance is weak because the diffused resistor section is thinned; and 5) It takes time to fabricate the element because the diffused resistor section is thinned.

The present invention allows a large number of acceleration sensor elements to be obtained from a semiconductor substrate and thereby to supply low cost acceleration sensors by a simple method of forming cantilevers by removing the substrate having diffused resistors.

Furthermore, the present invention allows a structure to be obtained having a strong shock resistance because the cantilever is constructed as a plane having a uniform thickness and no stress concentrates at any one part thereof.

While the method of thinning by the wet-type process is used when the pressure reference chamber is provided to detect a displacement by the diaphragm in the case of the pressure sensor of a semiconductor device, it has had the following problems similarly to the acceleration sensor:

1) Because the photolithographic process is employed, the manufacturing process such as an application of resist is prolonged;

2) Because a strong base or the like is used in etching the diaphragm and the chemical is influential to parts other than the diaphragm, the process which may be used in the fabrication of the parts other than the diaphragm is limited;

3) A time for processing the diaphragm and a finished thickness vary considerably depending on a condition of the etchant due to the wet-type process, thereby lowering a yield thereof; and 4) Because the wet-type process is employed, a time for processing the diaphragm and a finished thickness vary considerably depending on a condition of the etchant, thereby lowering a yield thereof.

Accordingly, it is an object of the present invention is to solve the aforementioned problems of the past by providing a semiconductor pressure sensor whose diffused resistors may be readily processed and which has a high sensitivity.

Next, a conventional destruction preventing mechanism will be explained with reference to FIGS. 61 through 63. In FIGS. 61 through 63, a base 801 is interposed between an upper stopper 803 and a lower stopper 804 and a deformation of the base 801 is limited for an excessive acceleration. FIG. 62 shows positions of the base 801, the upper stopper 803 and the lower stopper 804 in a state wherein no acceleration is applied. In states wherein an acceleration is applied in FIGS. 61 and 63, FIG. 61 shows a case when a destruction of the base 801 is prevented by the upper stopper 803. However, a load is applied to a thin section and there has been a possibility that the base 801 is destroyed from the thin section. In FIG. 63, there has been a possibility that the base 801 is destroyed by the lower stopper 804.

Accordingly, the destruction preventing mechanism of the prior art acceleration sensor has had the following problems:

1) Because the stopper for preventing an excessive displacement caused by a great acceleration hits with a distal end of the cantilever, causing an excessive displacement, an impact is exerted on the cantilever;
2) A load is applied to the thin section having the diffused resistance; and
3) Although a measure of filling silicon oil within a case of the acceleration sensor has been taken to reduce the impact, the installation of a manufacturing facility to fill the silicon oil is expensive.

Accordingly, further objects of the present invention are to:

1) have a structure which allows to reduce the impact;
2) reduce the load applied on the thin section having the diffused resistance; and
3) reduce the manufacturing cost and enhance the shock resistance thereof.

SUMMARY OF THE INVENTION

In order to solve the aforementioned problems, the following means have been adopted.

As a first means, an element of a semiconductor device including a semiconductor acceleration sensor and a semiconductor pressure sensor is formed into a pillared or column shape (rectangular parallelepiped).

As a second means, a diffused resistor section for detecting a stress is formed to have a same thickness with a cantilever without thinning it. The element has a flat plane without having a thin section.

As a third means, the element of the semiconductor acceleration sensor is taken out of the semiconductor substrate to bond to a supporter.

As a fourth means, a connector for connecting a deflecting section (cantilever) which is displaced by a stress with a supporter for supporting the deflecting section is formed of a polymeric material.

As a fifth means, the deflecting section (cantilever) is connected with the supporter for supporting the deflecting section mechanically.

As a sixth means, glass is used for the supporter and the cantilever and the supporter is connected by means of anodic bonding.

As a seventh means, an electrical circuit is formed into a CMOS structure.

As an eighth means, a temperature compensating circuit for eliminating a drift caused by temperature is mounted on the semiconductor element of the cantilever.

As a ninth means, a circuit for amplifying an output of a potential proportional to an acceleration is put together to be able to sufficiently accommodate with a very weak output from the displaced cantilever even if it is in an order of micro-volt by amplifying it.

As a tenth means, trimming for adjusting a voltage output from the amplifier circuit to an output value to obtain a desirable output value is carried out by providing several resistors and by eliminating the resistors in conformity with the output.

As an 11th means, weights are disposed at several places of the cantilever and the weights to be taken are selected or trimmed in conformity with the output since it is very difficult to keep the weight at an adequate mass.

As a 12th means, a method of packaging an acceleration sensor, which permits trimming after the installation of the package by using laser beam, is adopted.

As a 13th means, diffused resistors and electrical wiring are disposed on the side of the cantilever in the semiconductor device including the semiconductor acceleration sensor of the present invention.

As a 14th means, a method of detecting changes of resistance values which correspond to compression and tensile stresses by disposing diffused resistors in the vicinity of the surface and of the back of the cantilever is adopted.

The following means have been adopted to solve the problems of the pressure sensor.

As a 15th means, a base 702 having a diaphragm and a sensor element 701 are created to be separate members and are bonded.

As a 16th means, the sensor element 701 having the diffused resistors on the side thereof (at a position vertical to the diaphragm) is provided on the base 702 having the diaphragm constituting a pressure reference chamber.

As a 17th means, a method of detecting changes of resistance values which correspond to compression and tensile stresses by a bridge circuit by disposing the diffused resistors in the vicinity of the surface (on the side the pressure is applied) and of the back (on the side of the diaphragm) of the element is adopted.

As an 18th means, only an edge of the sensor element 701 having the diffused resistors 708 is fixed.

As a 19th means, the sensor element 701 having the diffused resistors 708 is cut out and is bonded to the base 702 having the diaphragm 704.

As a 20th means, the sensor element 701 is bonded to a base 716 having an opening.

As a 21st means, the sensor element 701 is polished to thin after cutting it out of a semiconductor substrate and bonding to the base 702 having the diaphragm 704.

As a 22nd means, the stopper for preventing a destruction is formed so as to conform to a shape of the cantilever which is deformed by an acceleration in order to enhance a shock resistance. Note that in the present invention it is preferable to form the stopper with a shape in conformity with the deflection curve of the cantilever.

As a 23rd means, the diffused resistor side of the acceleration sensor having the diffused resistors is fixed so as to face to the supporting substrate to be able to protect the acceleration sensor by the supporting substrate even when it receives an excessive acceleration. Further, the output pads of the acceleration sensor element 1001 are bonded with the wiring board by reflow to be able to fix the acceleration sensor element 1001 with the wiring board and to implement the method of taking out the electrical signals in the same time.

FIG. 1 a block diagram showing one example of a typical structure of a semiconductor acceleration sensor of the present invention. A cantilever 1 is connected with a supporter 2 by supporter connecting means 101. An acceleration signal detected by the cantilever 1 is amplified by an amplifier circuit 103 and is transmitted to output means 104. At this time, a drift caused by a temperature may be eliminated by a temperature compensating circuit 102.

FIG. 2 is a block diagram showing a method for fabricating the acceleration sensor of the present invention. The cantilever is fabricated in Step 201, the supporter is fabricated in another process in Step 202 and then the cantilever is connected with the supporter in Step 203.

FIG. 3 is a block diagram showing a process for fabricating the acceleration sensor of the present invention. Semiconductor elements including the amplifier circuit and the temperature compensating circuit are fabricated in Step 301, trimming of gain and offset on a wafer is carried out in Step 302 and the elements are separated into individual elements by dicing in Step 303. The semiconductor element is fixed to the supporter in Step 304 and a case is fixed with a terminal base in Step 305. Next, an offset voltage and gain are measured in Step 306 and based on that data, resistors R are cut off by means of laser to trim the offset and gain in Step 307. Finally, frequency characteristics and temperature characteristics are measured in Step 308 as a delivery inspection. The sensor is shipped thereafter.

FIG. 4 is a block diagram showing another process for fabricating the acceleration sensor of the present invention. The trimming of the gain and offset on the wafer may be cut. The aforementioned means allow to obtain the following operations.

By adopting the first means, the cantilever can be formed easily without thinning the diffused resistor section.

By adopting the second means, the cantilever can be formed easily without thinning the diffused resistor section.

By adopting the third means, the process is not prolonged like the monolithic process by a silicon process because each individual function may be fabricated separately. Further, it allows to solve the problem of deformation caused by a stress of film which is a problem in a thin-film process. It allows to form the cantilever section in the existing semiconductor process and to form a semiconductor element having a size of 8 mm in length, 0.5 mm in width and 0.1 mm in thickness in the present semiconductor process.

By adopting the fourth means, the cantilever 1 can be connected with the supporter 2 in low temperature and parts of the cantilever 1 or the supporter 2 may be readily replaced.

By adopting the fifth means, the cantilever 1 may be connected with the supporter 2 rigidly and the parts of the cantilever 1 or the supporter 2 may be readily replaced.

By adopting the sixth means, the cantilever 1 may be readily connected with the supporter 2.

By adopting the seventh means, a low power consuming circuit may be constructed.

By adopting the eighth means, the temperature compensating circuit may be readily installed on the cantilever 1 because the cantilever 1 is formed in the semiconductor process.

By adopting the ninth means, the amplifier circuit may be readily installed on the cantilever 1 because the cantilever 1 is formed in the semiconductor process.

By adopting the tenth means, it becomes possible to obtain the desired value by eliminating and trimming the resistors in conformity with the output.

By adopting the 11th means, the dispersion of the output caused by a dispersion of the thickness of the cantilever 1 may be adjusted finely by outside means.

By adopting the 12th means, the dispersion of the output caused by the dispersion of the thickness of the cantilever 1 may be adjusted finely by outside means.

By adopting the 13th means, i.e. by disposing an electrical circuit pattern such as the diffused resistors and the output section on the side of the semiconductor acceleration sensor, a number of elements taken out of the semiconductor substrate may be increased, thus allowing to reduce the production cost. Further, because it can be fabricated having a uniform thickness, it has an excellent shock resistance.

By adopting the 14th means, twice the sensitivity can be obtained as an output value as compared to what the diffused resistors are disposed on the surface of the element.

By adopting the 15th means, i.e. by processing the sensor element 701 independently from the step of forming the diaphragm 704 of the base 702, the sensor element 701 may be formed without being influenced by the step of forming the base 702, i.e. the diffused resistors 8 may be formed with high precision.

By adopting the 16th means, i.e. by providing the sensor element 701 comprising the diffused resistors 708 on the side thereof (at position vertical to the diaphragm) on the base 702 having the diaphragm 704 which constitutes the diaphragm 704, the semiconductor device can be manufactured having a good yield since the element is not formed integrally with the pressure reference chamber.

By adopting the 17th means, changes of resistance values obtained by multiplying a compression stress applied to diffused resistors 783 and 784 and a tensile stress applied to diffused resistors 781 and 782 in FIG. 36 are obtained as output values.

By adopting the 18th means, only the positive characteristic can be output by the reference pressure of the diaphragm.

By adopting the 19th means, i.e. by cutting the sensor elements 701 out of the semiconductor substrate and by bonding it with the base 702 having the diaphragm 704, the sensor element 701 can be readily manufactured with a good yield.

By adopting the 20th means, no step for forming the diaphragm 704 in the base 702 is required and the base 702 can be manufactured very easily.

By adopting the 21st means, i.e. by thinning the sensor element, the detecting sensitivity can be enhanced.

By adopting the 22nd means, the stopper can relax a shock through a contact by the face, not by the point, and prevent a destruction because the structure of the stopper is the same with the deflection curve of the cantilever even if the cantilever displaces by receiving an excessive acceleration.

When an acceleration is applied homogeneously to the cantilever, the deflection curve thereof may be represented by the following equation:

$$y = Wl^4/8EI(1-4x/3l+x^4/3l^4) \qquad (1)$$

where, y is a deflection, W is a mass, l is a length of the cantilever, E is a longitudinal elastic modulus and I is a sectional secondary moment.

By adopting the 23rd means, elements which hardly receive an influence of twist or the like and receive no influence from another axis may be provided by facing the diffused resistor side to the wiring board in the arrangement in which the electrical circuit patterns such as the diffused resistors and the output section are disposed on the side of the semiconductor acceleration sensor. Further, the elements show good characteristics by the following reasons even in the method of thinning the diffused resistor section of the prior art products. That is, generally silicon is used as the material used for the semiconductor acceleration sensor. While silicon material has an excellent signal converting effect, it also has characteristic qualities in terms of mechanical quality. For example, although Young's modulus of silicon differs more or less depending on crystal directions, its maximum value is close to that of steel and shows a good spring characteristic.

For the acceleration sensor element structured by a cantilever whose one end is supported, it is harder to be destroyed when it receives an acceleration from the diffused resistor side as compared to a case when it receives an acceleration from the side having the thin section of the acceleration sensor as shown in FIG. 72.

Then, the present invention is constructed so that the diffused resistor side of the acceleration sensor having the diffused resistors faces to the wiring board and as a result, the following operations can be obtained.

1) By constructing so that the diffused resistor side faces to the supporting substrate, the sensor element contacts with the wiring board when it displaces toward the diffused resistor side, thus preventing the destruction of the element; and 2) By facing the wiring of the acceleration sensor to the wiring board, the wiring can be connected and outputs can be made readily.

BRIEF DESCRIPTION OF THE DRAWING

In order to more fully understand the drawing used in the detailed description of the present invention, a brief description of each drawing is provided.

FIG. 11 is a circuit diagram of an amplifier circuit of the semiconductor acceleration sensor of the present invention;

FIG. 12 is a circuit diagram of an amplifier circuit of the semiconductor acceleration sensor of the present invention;

FIG. 23 is a drawing showing the semiconductor acceleration sensor of the present invention;

FIGS. 41A–42B are explanatory drawings showing the operation of the sensor element of the present invention;

FIGS. 42A–42B are explanatory drawings showing the operation of the sensor element of the present invention;

FIG. 52 is a graph showing an output voltage from 0° to 360° of a biaxial sensor of the present invention;

FIG. 53 is a drawing for explaining the biaxial sensor of the present invention;

FIG. 59 is a plan view showing a layout of the electrical circuit of the present invention;

FIG. 61 is a drawing explaining the prior art semiconductor acceleration sensor;

FIG. 62 is a drawing explaining the prior art semiconductor acceleration sensor;

FIG. 63 is a drawing explaining the prior art semiconductor acceleration sensor;

FIG. 64 is a drawing explaining the semiconductor acceleration sensor of the present invention;

FIG. 65 is a drawing explaining the semiconductor acceleration sensor of the present invention;

FIG. 66 is a drawing explaining the semiconductor acceleration sensor of the present invention;

FIGS. 71A–71E are explanatory drawings showing a manufacturing method of the semiconductor acceleration sensor according to a 25th embodiment of the present invention;

FIGS. 72A–72B are drawings explaining the embodiment of the prior art semiconductor acceleration sensor;

DETAILED DESCRIPTION OF THE PREFERRED EMBODIMENTS

Preferred embodiments of the present invention will be explained below with reference to the drawings.

First Embodiment

Figure 1:
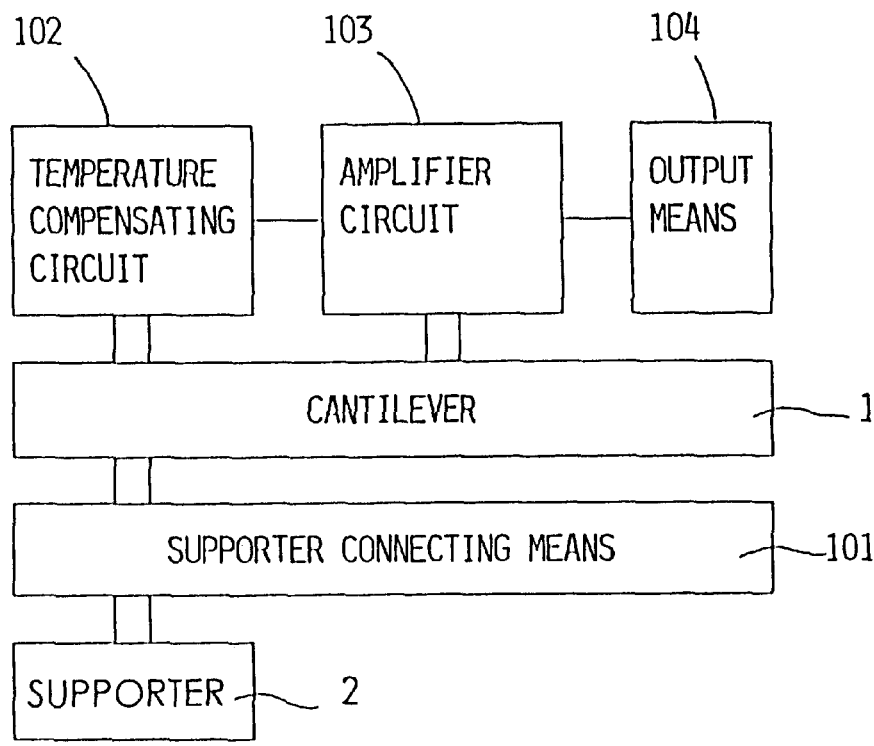
FIG. 1 is a block diagram of a semiconductor acceleration sensor of the present invention.
Figure 2:
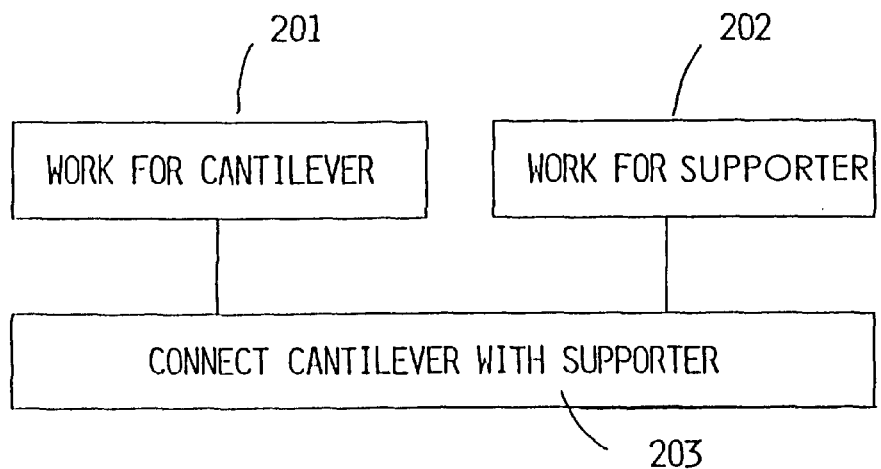
FIG. 2 is a block diagram showing a manufacturing process of the semiconductor acceleration sensor of the present invention.
Figure 3:
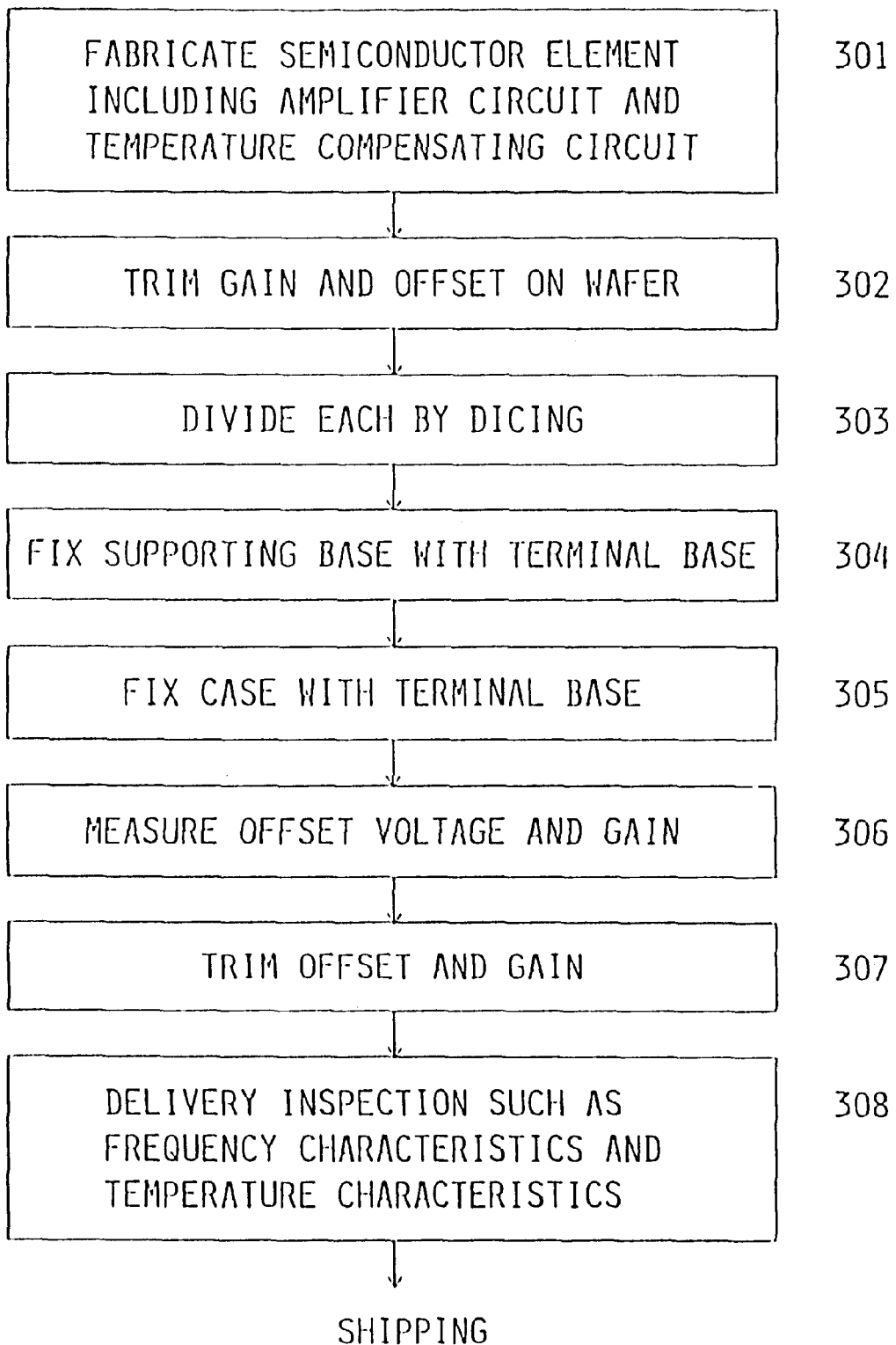
FIG. 3 is a block diagram showing a manufacturing process of the semiconductor acceleration sensor of the present invention.
Figure 4:
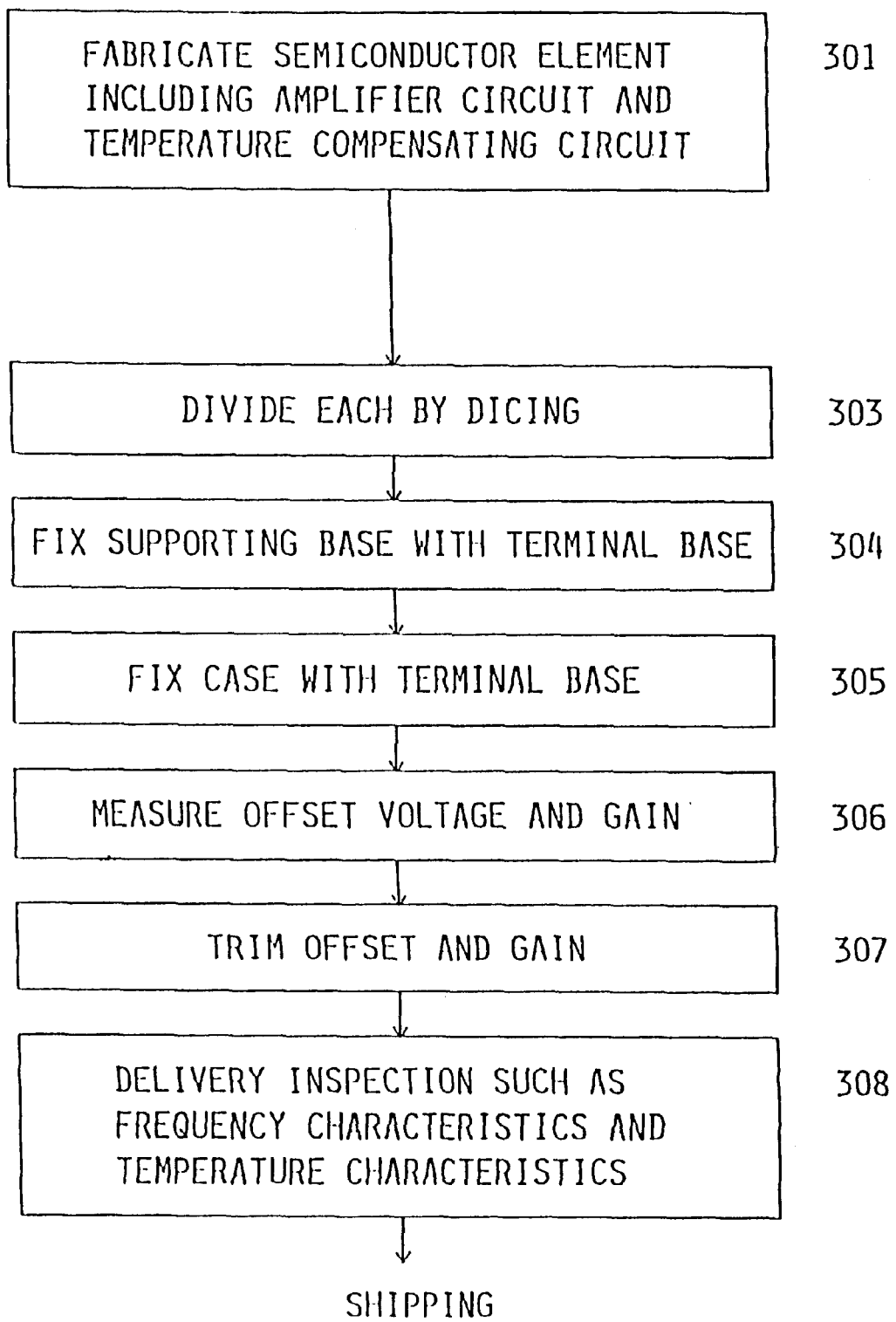
FIG. 4 is a block diagram showing a manufacturing process of the semiconductor acceleration sensor of the present invention.
Figure 5:
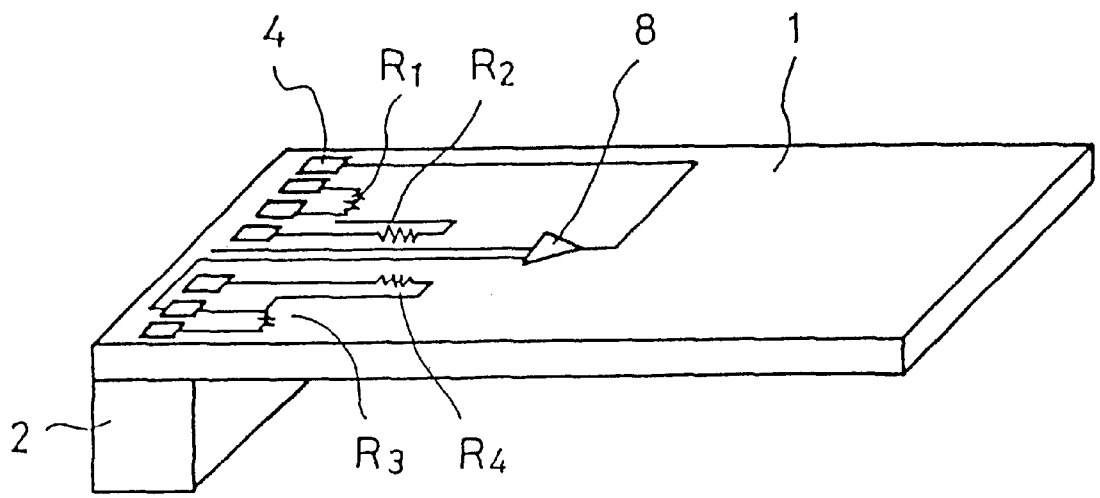
FIG. 5 is a perspective view of the semiconductor acceleration sensor of the present invention.
Figure 6:
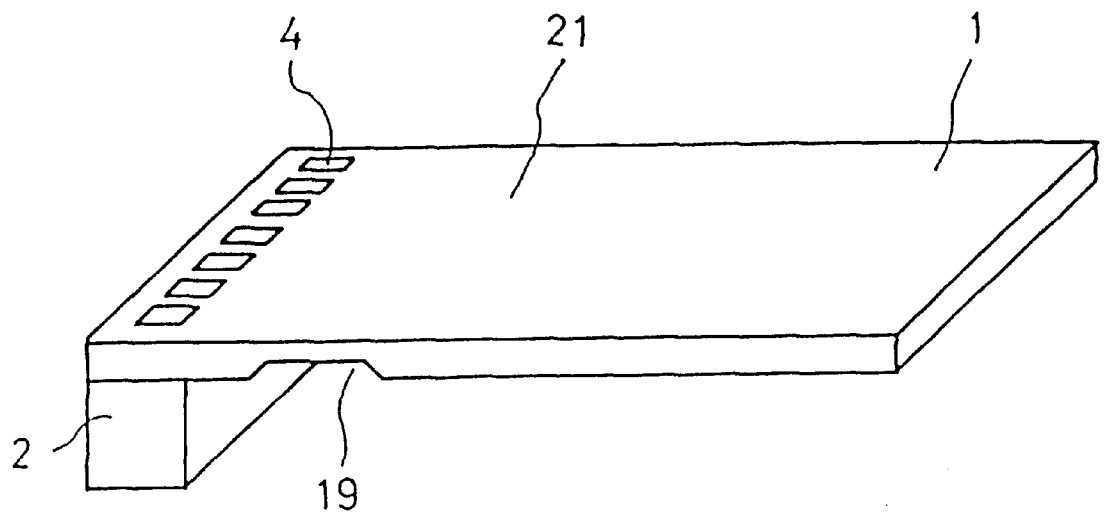
FIG. 6 is a perspective view of a prior art semiconductor acceleration sensor.

FIG. 5 is a perspective view of a semiconductor acceleration sensor of a semiconductor device of the present invention. In the semiconductor acceleration sensor, diffused resistors R are connected to a cantilever 1 with a bridge circuit, a temperature compensating circuit and an amplifier circuit are added and the cantilever 1 is bonded with a supporter 2. In the present embodiment, the cantilever 1 and the supporter 2 are constructed as being independent parts, not processed monolithically. The present embodiment allows to realize a device having a length of 8 mm, a width of 0.5 mm and a thickness of 0.1 mm, which is considerably small as a semiconductor device.

In a method for fabricating the semiconductor acceleration sensor of the present invention, a semiconductor device which becomes the cantilever 1 is fabricated first and then the supporter 2 is fabricated. The supporter 2 is fabricated using the same material as for the semiconductor device in order to avoid an influence of a thermal stress as much as possible. Next, as for connection of the cantilever 1 and the supporter 2, FIGS. 7 through 10 show methods for connecting the cantilever 1 with the supporter 2.

Second Embodiment

Figure 7:
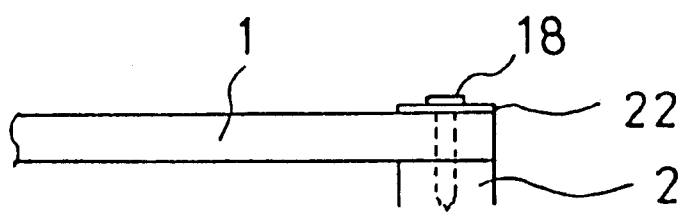
FIG. 7 is a side view showing how to fix a cantilever with a supporter of the present invention.

An easy way to fix the cantilever 1 and the supporter 2 is to fix them mechanically as shown in FIG. 7. They may be fixed by boring a bolt hole on the supporter 2 and by fastening the cantilever 1 together with a stay 22 for pressing the cantilever.

Third Embodiment

Figure 8:
FIG. 8 is a side view showing how to fix the cantilever with the supporter of the present invention.

As shown in FIG. 8, a glass 5 is used for the supporter and is bonded with the cantilever 1 by anodic bonding.

Fourth Embodiment

Figure 9:
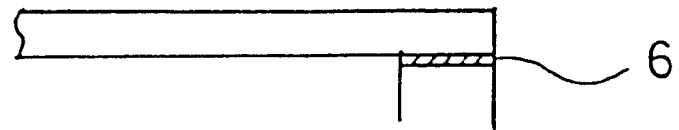
FIG. 9 is a side view showing how to fix the cantilever with the supporter of the present invention.

They may be bonded readily by using an adhesive or a polymeric material typified by an epoxy resin 6 as shown in FIG. 9.

Fifth Embodiment

Figure 10:
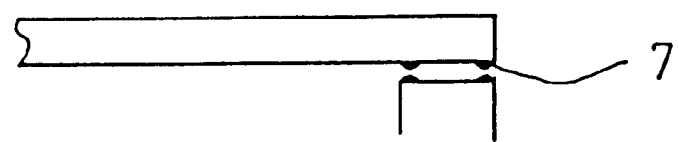
FIG. 10 is a side view showing how to fix the cantilever with the supporter of the present invention.

They may be bonded also by metal fusion coupling, interposing a solder bump 7, as shown in FIG. 10.

Sixth Embodiment

However, it is preferable to use a bond having the same thermal expansion coefficient with the cantilever 1 and the supporter 2 in order to eliminate a thermal stress.

Seventh Embodiment

Because an output of the semiconductor acceleration sensor of the present invention having the aforementioned size was 0.1 mV when it was calculated considering that the weight weighs 2.8 mg and it is small as an output value, an output amplifying circuit is installed in the structure of the semiconductor acceleration sensor to obtain 100 times of gain.

Eighth Embodiment

Figure 13:
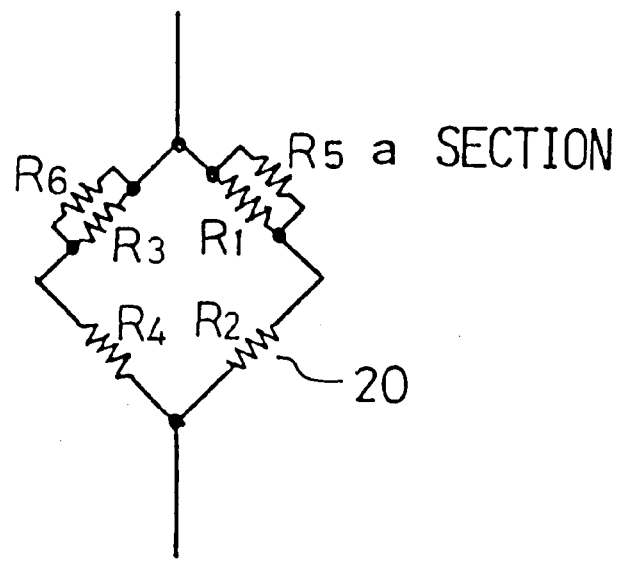
FIG. 13 is a circuit diagram showing trimming sections of a differential amplifier circuit of the present invention.
Figure 14A:
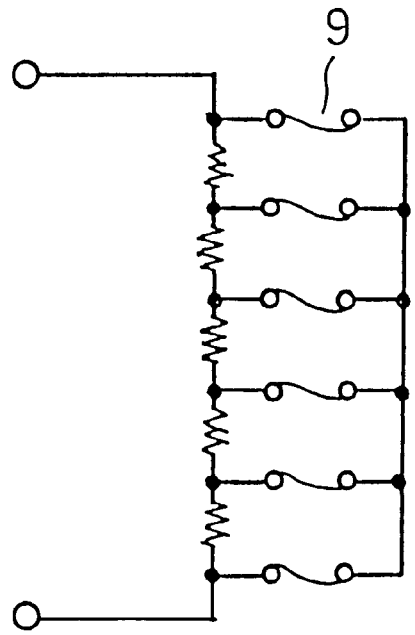
FIGS. 14A–14B are explanatory diagram showing a trimming method of a bridge circuit of the present invention.
Figure 15:
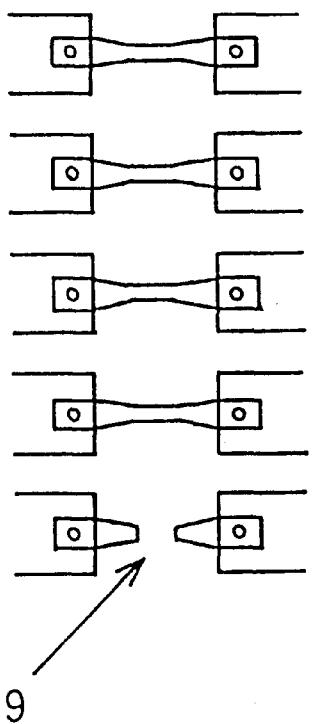
FIG. 15 is a explanatory diagram showing a trimming method of the bridge circuit of the present invention.

Because the cantilever 1 of the present invention is a semiconductor element, a temperature compensating circuit for avoiding an influence of a temperature drift may be installed within the element. It is also possible to give a trimming function to the circuit. FIGS. 12 and 13 show block diagrams of the circuit. FIG. 12 shows a differential amplifier circuit installed in connection with a bridge circuit 20. A circuit 9 for trimming is provided to the differential amplifier circuit. The trimming circuit 9 is constructed as shown in FIG. 14A and trimming is performed by cutting an unnecessary resistor by laser light in conformity with an output as shown in FIG. 15.

The resistors to be trimmed are formed on the supporter section of the sensor.

Figure 14B:
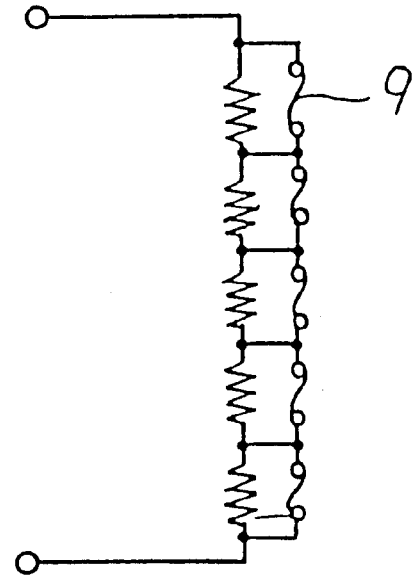

A trimming method as shown in FIG. 14B may be also adopted.

Ninth Embodiment

Resistors R5 and R6 are provided in the bridge circuit 20 as shown in FIG. 13 to create an element for trimming in conformity with an output. A resistors for offset is provided in the operational amplifier circuit as shown in FIG. 11 to regulate the offset. The trimming for the offset and amplification is carried out in the same manner with the aforementioned trimming method in which several resistors are prepared and unnecessary resistors are eliminated by laser light and the like as shown in FIGS. 14 and 15.

Tenth Embodiment

Figure 16:
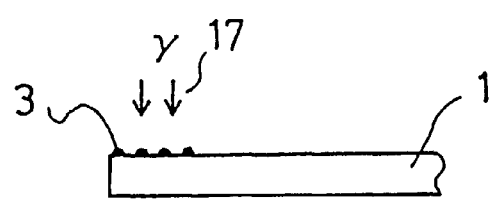
FIG. 16 is a side view of the semiconductor acceleration sensor of the present invention.

As shown in FIG. 16, the weight 3 is provided on the distal end of the cantilever 1 in order to increase a displacement.

11th Embodiment

Figure 17:
FIG. 17 is an explanatory diagram showing a trimming method by means of laser light of the present invention.

FIG. 17 shows a case when the weight 3 is trimmed. Several weights 3 are provided on the edge of the cantilever 1. A relationship between the position of the weights 3 and an output is calculated in advance and the weight at an appropriate address is eliminated in conformity with a specified output value by laser light 17. This method allows to obtain an acceleration sensor producing more accurate output values.

12th Embodiment

Figure 18:
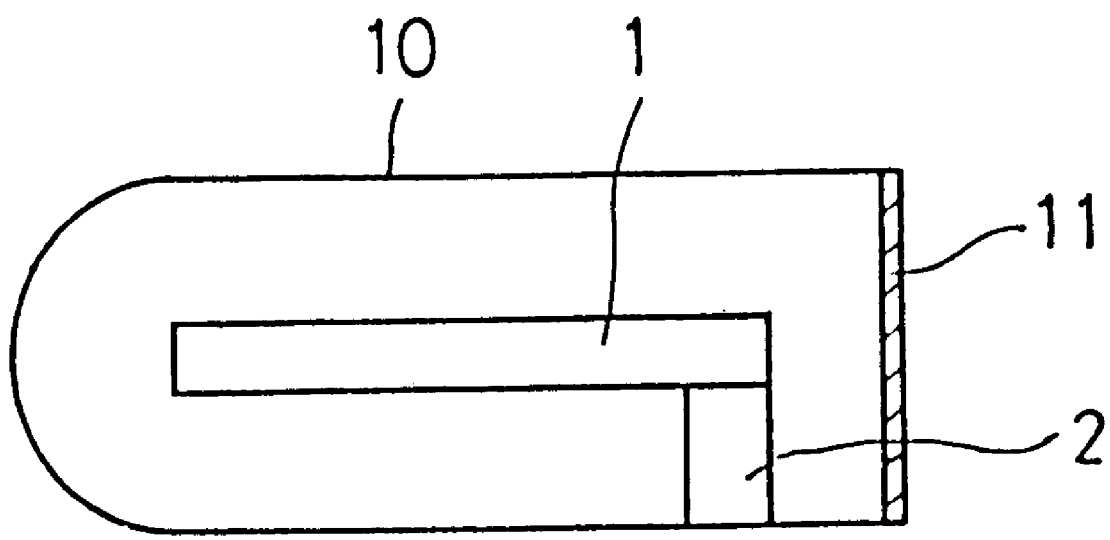
FIG. 18 is a drawing showing a method of packaging the semiconductor acceleration sensor of the present invention.

When the cantilever, supporter and weight are covered by a glass tube 10 or the like, it is possible to readily and finely adjust them from outside through the glass tube by the wavelength of the laser light 17. FIG. 18 shows this package structure. It is also possible to enhance a shock resistance of the package structure by using an elastic body for a part for attaching the package to a semiconductor sensor structure.

13th Embodiment

FIGS. 19 through 23 show an example of a fabrication process of the semiconductor sensor of the present embodiment in detail.

Figure 19A:
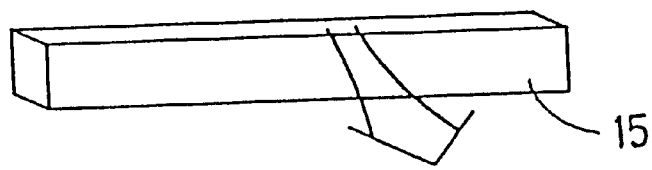
FIGS. 19A–19B are drawings showing a semiconductor element of the present invention.
Figure 19B:
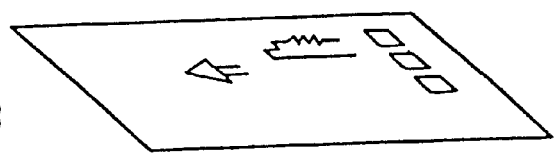
Figure 20:
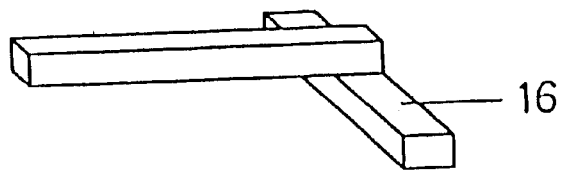
FIG. 20 is a drawing showing the semiconductor element of the present invention.
Figure 21:
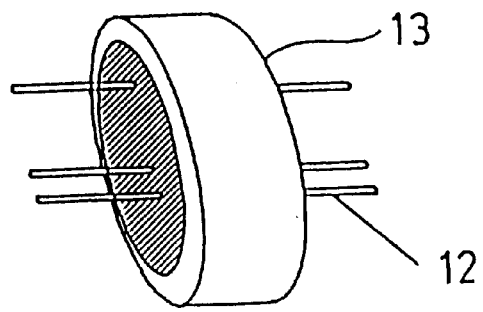
FIG. 21 is a drawing showing a terminal base of the present invention.
Figure 22:
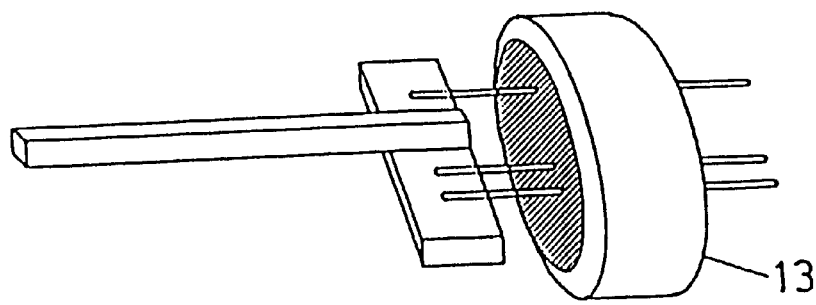
FIG. 22 is a drawing showing the semiconductor acceleration sensor of the present invention.

As shown in a diagrammatic view in FIG. 19A, a semiconductor device 15 including an amplifier circuit and a temperature compensating circuit is fabricated at first. FIG. 19B shows a pattern of the semiconductor device 15. Then, as shown in FIG. 20, the semiconductor device 15 is fixed with a supporting base 16 for displacing it. Next, a terminal base 13 in which stainless terminals 12 run through the hollow tube and are fixed by flowing molten glass into the tube is fabricated as shown in FIG. 21. Next, as shown in FIG. 22, the terminal base 13 is attached to the semiconductor device 15 by fixing it to the supporting base 16. Finally, the acceleration sensor is completed by mounting a protection tube 14 as shown in FIG. 23. It is preferable to use a glass tube for the protection tube 14 which permits the introduction of laser light 17 from the outside of the protection tube 14. Although no stopper is used for an excessive displacement caused by an impact in this example, it is preferable to use stoppers. However, the present invention has a stronger shock resistance as compared to the method of thinning the diffused resistor section.

14th Embodiment

Figure 24:
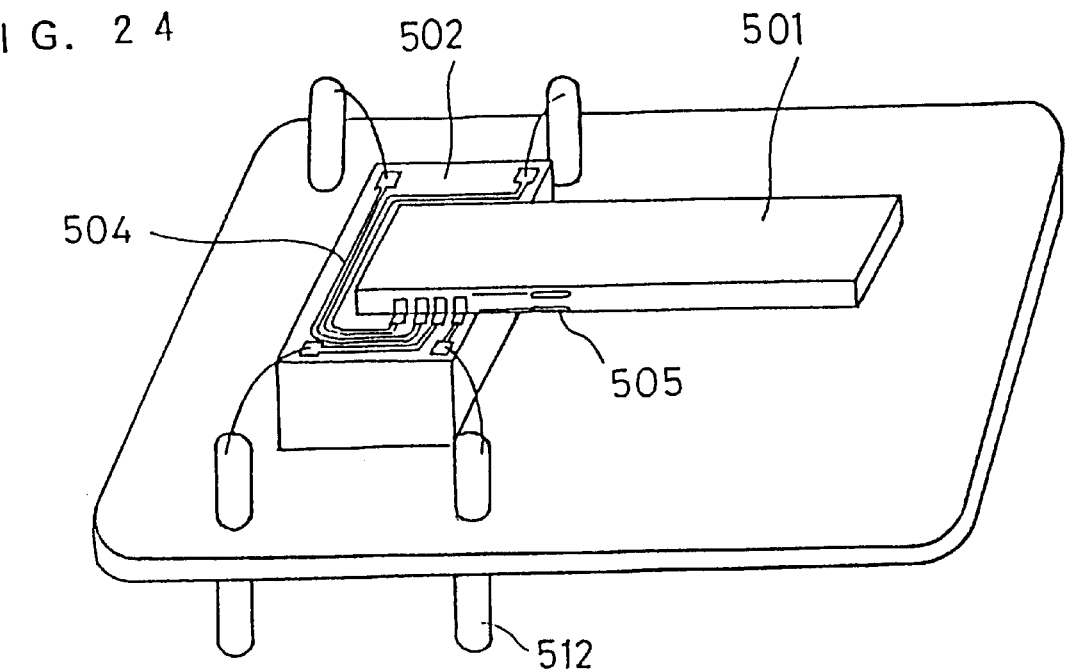
FIG. 24 is a perspective view of an embodiment of the semiconductor acceleration sensor of the present invention.

Next, an embodiment in which a diffused resistor is provided on the side of the cantilever of the semiconductor acceleration sensor of the present invention will be described. The present embodiment will be explained below with reference to the drawings. FIG. 24 is a perspective view of the embodiment in which an electrical circuit is installed on the side of the semiconductor acceleration sensor of the present invention.

In FIG. 24, the sensor comprises a cantilever 501 for detecting a stress and a supporter 502 for supporting the cantilever section. Weights are provided at the distal end of the cantilever depending on an output value. Diffused resistors, a pad section for output, wirings, a temperature compensating circuit and an amplifier circuit are disposed on the side of the cantilever 501. The output value is output from terminals 512 added to the package via the wiring 504 on the supporting base 502.

Figure 29:
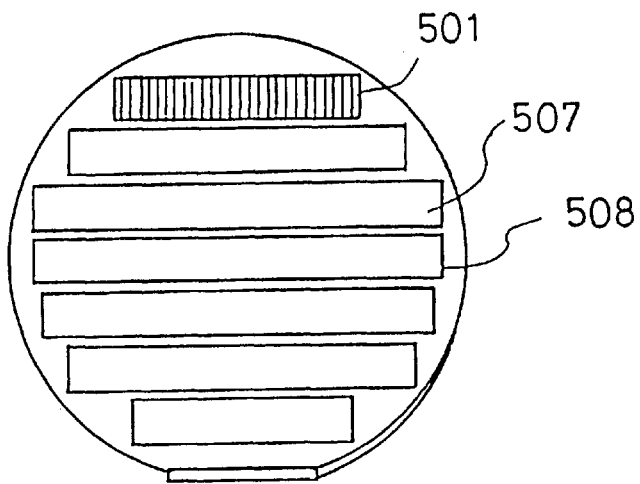
FIG. 29 is a drawing for explaining positions of elements within a wafer-state silicon plate in one embodiment of the present invention.
Figure 30:
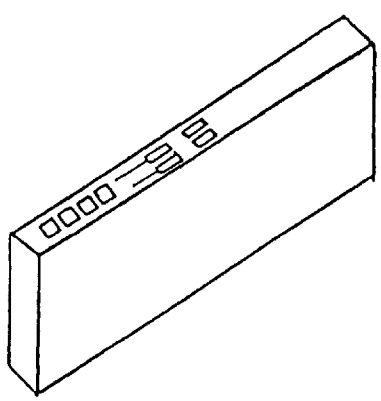
FIG. 30 is an explanatory drawing showing a state wherein an element is taken out according to one embodiment of the present invention.

A method for fabricating the sensor of the present invention will be explained below. At first, semiconductor elements having a shape of cantilever and diffused resistors 505 are formed on a semiconductor substrate 507 as shown in FIG. 29. A line 508 for scribing is drawn on the peripheral portion of each semiconductor element to cut by dicing based on the line. An outside dimension of the pattern has been 6 mm in length, 0.1 mm in width and 0.525 mm in height which is normally used for a semiconductor device in the present embodiment. FIG. 30 shows the semiconductor element formed by dicing. The dicing allows fabrication of an element having a width of 0.1 mm readily.

Figure 31:
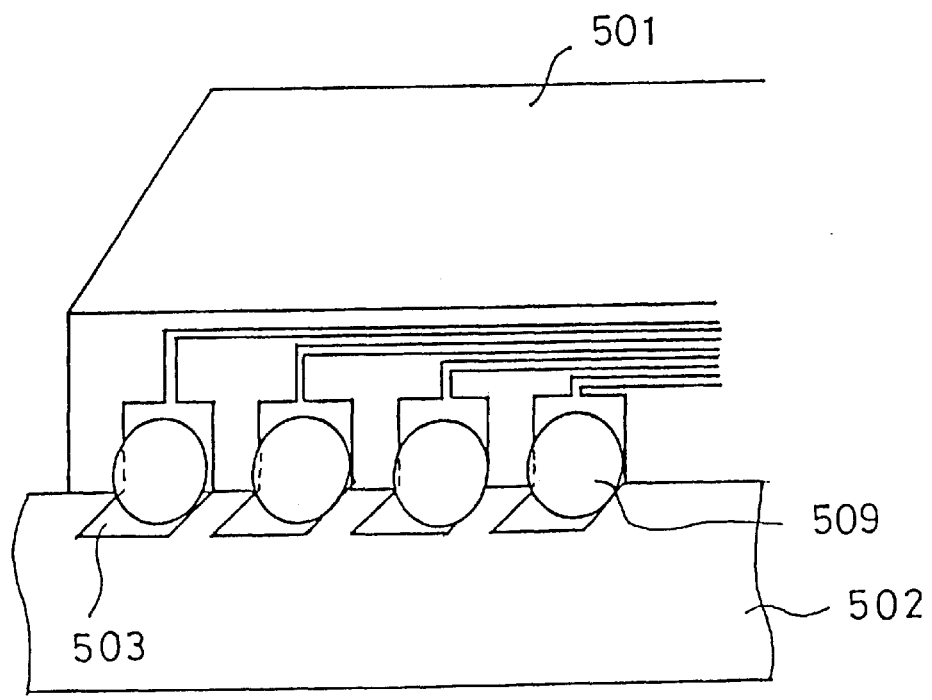
FIG. 31 is an explanatory drawing showing a connection of the element with a supporting base according to one embodiment of the present invention.

Next, the cantilever 501 is bonded with the supporter 502 by using a silicon adhesive in order to equalize their thermal expansion ratio. The wires of the cantilever 501 and the supporter 502 are connected by fabricating the pad sections 503 with gold and by bringing the pad of the cantilever 501 closer to that of the supporter 502 to bond by solder 509. FIG. 31 shows the bonded sections at this time. The cantilever 501 and the supporter 502 are thus bonded and finally, the terminals 512 of the package and the terminal pads of the supporting base 502 are wire-bonded to allow to output to the outside of the package.

Figure 25:
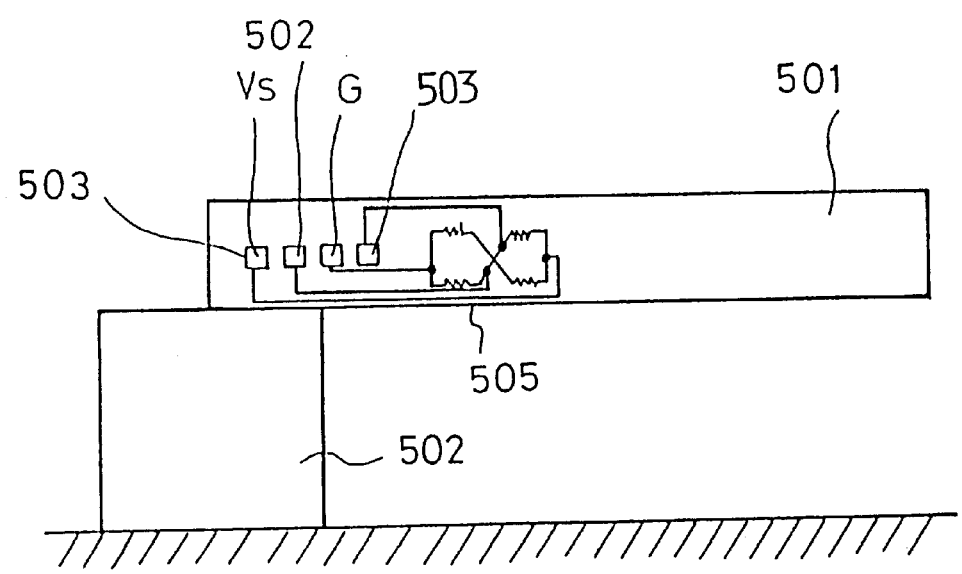
FIG. 25 is a diagrammatic view showing an electrical circuit of the semiconductor acceleration sensor of the present invention.
Figure 26:
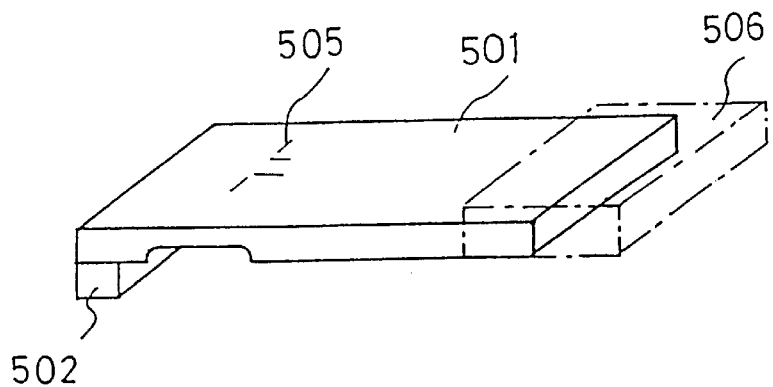
FIG. 26 is a perspective view of a prior art semiconductor acceleration sensor.
Figure 27:
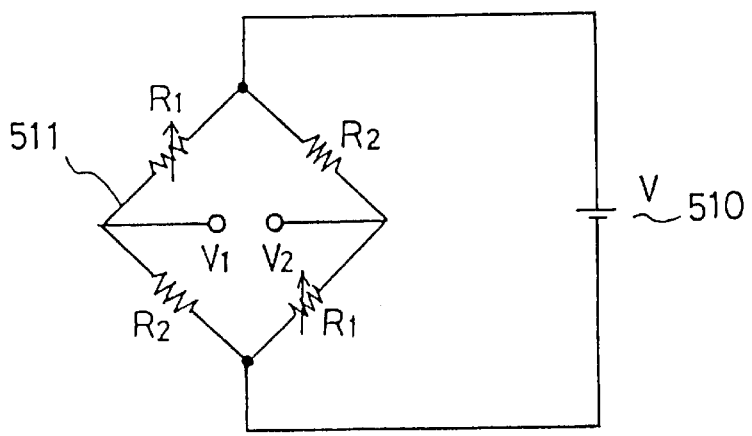
FIG. 27 is a block diagram showing an electrical circuit of the prior art semiconductor acceleration sensor.

Next, the electrical circuit of the present invention will be explained with reference to FIG. 25. An output is detected from a difference between a compression stress and a tensile stress caused by a displacement of the cantilever 501 by the bridge circuit 511. This will be explained further in detail with reference to FIGS. 27 and 28. When there are diffused resistors on a plane with reference to FIG. 26, a bridge circuit 511 having referencing resistors $R_2$ and measuring resistors $R_1$ has been constructed in the past. When $R_2$ is R, $R_1$ may be represented as R+ΔR. An output $V_{OUT}$ at this time may be represented by the following equation:

$$V_1=(R/2R+\Delta R)V$$

$$V_2=(R+\Delta R/2R+\Delta R)V$$

$$V_{OUT}=V_2-V_1=(\Delta R/2R+\Delta R)V \quad (2)$$

Figure 28:
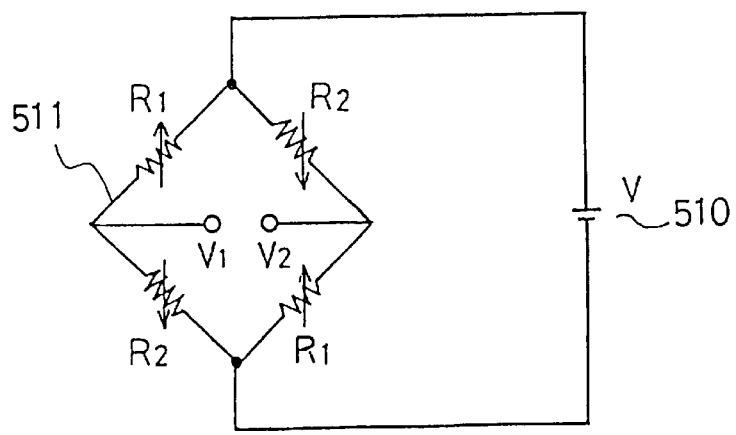
FIG. 28 is a block diagram showing the electrical circuit of the semiconductor acceleration sensor of the present invention.

In the electrical circuit of the present invention shown in FIG. 28, when $R_1$ has a resistance value caused by the compression stress $R+\Delta R_1$ and $R_2$ has a resistance value caused by the tensile stress R−ΔR, the output $V_{OUT}$ may be represented by the following equation:

$$V_1=(R-\Delta R/2R)V$$

$$V_2=(R+\Delta R/2R)V$$

$$V_{OUT}=V_2-V_1=(\Delta R/R)V \quad (3)$$

When ΔR is neglected as being a very small value from the equations (2) and (3), the electrical circuit of the present invention has two times of output.

In the present invention, a semiconductor acceleration sensor having 6 mm in length, 0.525 mm in width and 0.1 mm in thickness has been fabricated. When 5 V of voltage was applied to the semiconductor acceleration sensor, an output voltage thereof was 0.7 mV. The weights for increasing the output were added further, obtaining 3 mV of output. The output at that time was obtained without undergoing the amplifier circuit.

Although the diffused resistors have been provided only on one side of the cantilever in the present embodiment, it will be understood that it is effective to provided the diffused resistors on the side because it becomes possible to detect also a twist when they are provided on the both sides of the cantilever.

Although the size of the semiconductor acceleration sensor has been 6 mm in length, 0.525 mm in width and 0.1 mm in thickness in the present embodiment, it is possible to change the width to 0.3 mm for example depending on a semiconductor substrate used. In view of a thickness of a normal semiconductor substrate, it is about 0.2 mm to 1 mm.

Next, a structure in which the diffused resistors are provided on the side of the cantilever in the direction of an acceleration to be directed.

15th Embodiment

Figure 45:
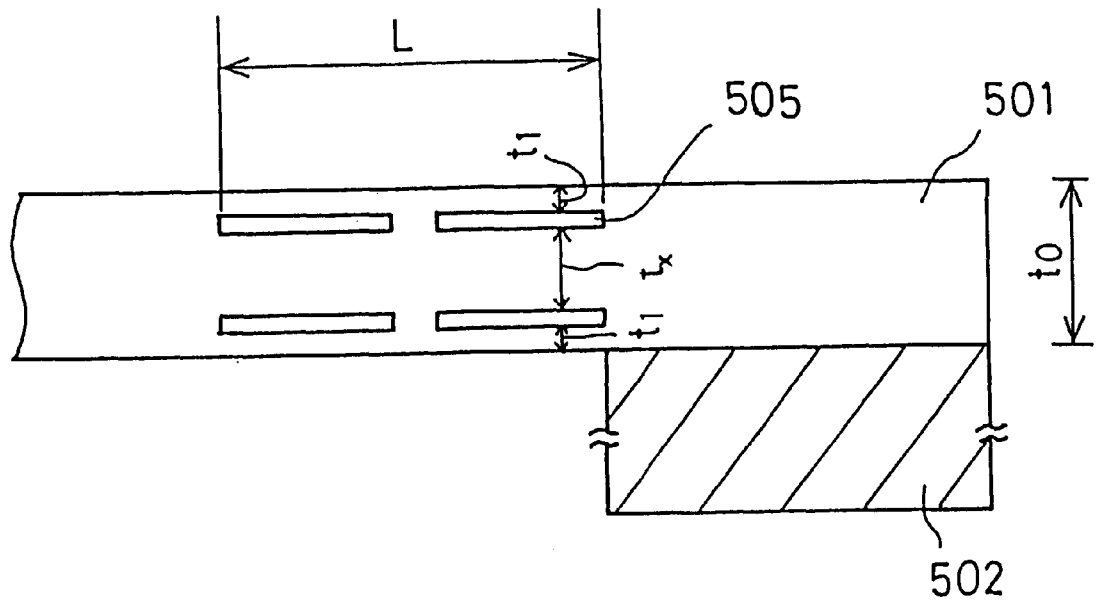
FIG. 45 is an explanatory drawing showing an arrangement of diffused resistors of the present invention.

FIG. 45 shows a structure (positional relationship) of the acceleration sensor having diffused resistors provided on the side of the cantilever in the acceleration detecting direction.

Figure 46:
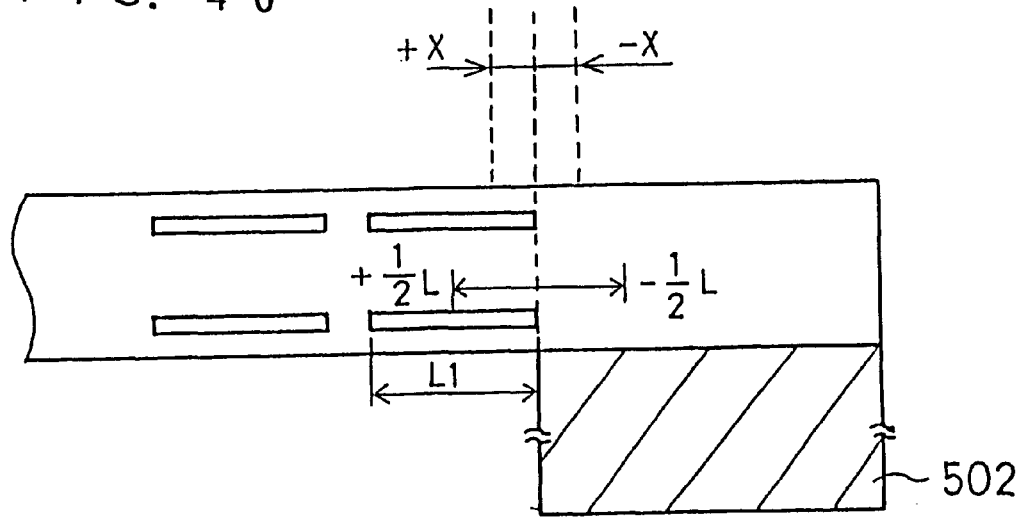
FIG. 46 is an explanatory drawing showing a relationship between the diffused resistors and the supporting base of the present invention.
Figure 47:
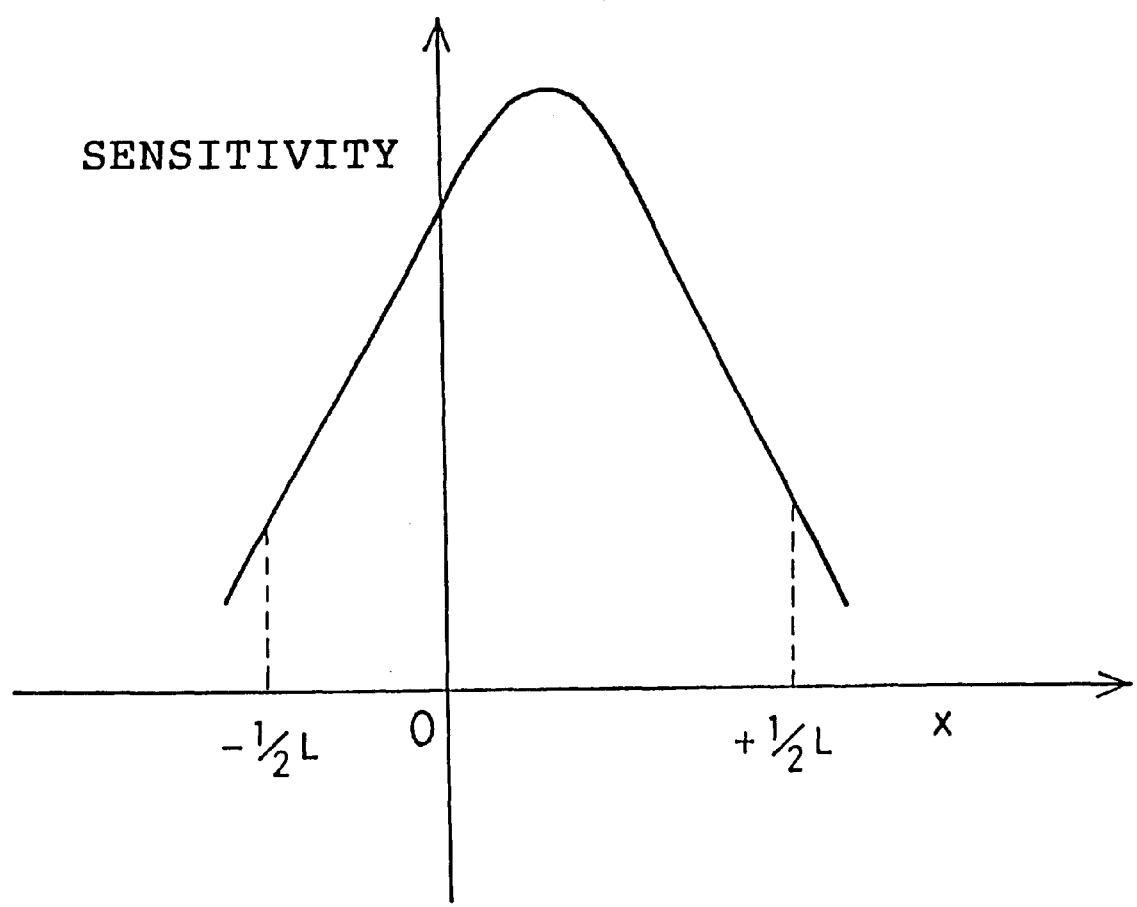
FIG. 47 is a graph explaining an output sensitivity in connection with the diffused resistors and the supporting base of the present invention.

The positional relationship between the cantilever 501 and the supporter 502 is important in order to output a maximum sensitivity. A reference position is set on the side of the supporter from a position at 1/2 L (L: whole length of diffused resistors) as shown in FIG. 45. An optimum value will be explained with reference to FIGS. 46 and 47. When the diffused resistor on the side of the supporter is $L_1$, it may be output in a range of ±1/2 $L_1$ (usable range). The optimum value is located at a position shifted in the plus direction (around 1/8 $L_1$) from a concentration of a stress. FIG. 47 shows a result at that time.

Next, a positional relationship of the diffused resistors to the width of the element will be explained with reference to FIG. 45. A higher sensitivity may be obtained when $t_1$ shown in the figure is closer to the outer periphery. The sensitivity may be also adjusted by adjusting $t_x$ and $t_0$.

A relational expression of $t_x$ and $t_0$ may be represented by the following equation:

$$V_{out}=V_2-V_1=(\Delta R/R)V \times (t_x+2t_1)/t_0 \quad (4)$$

That is, the sensitivity is improved when a ratio of $t_x$ is greater than $t_0$.

Figure 48:
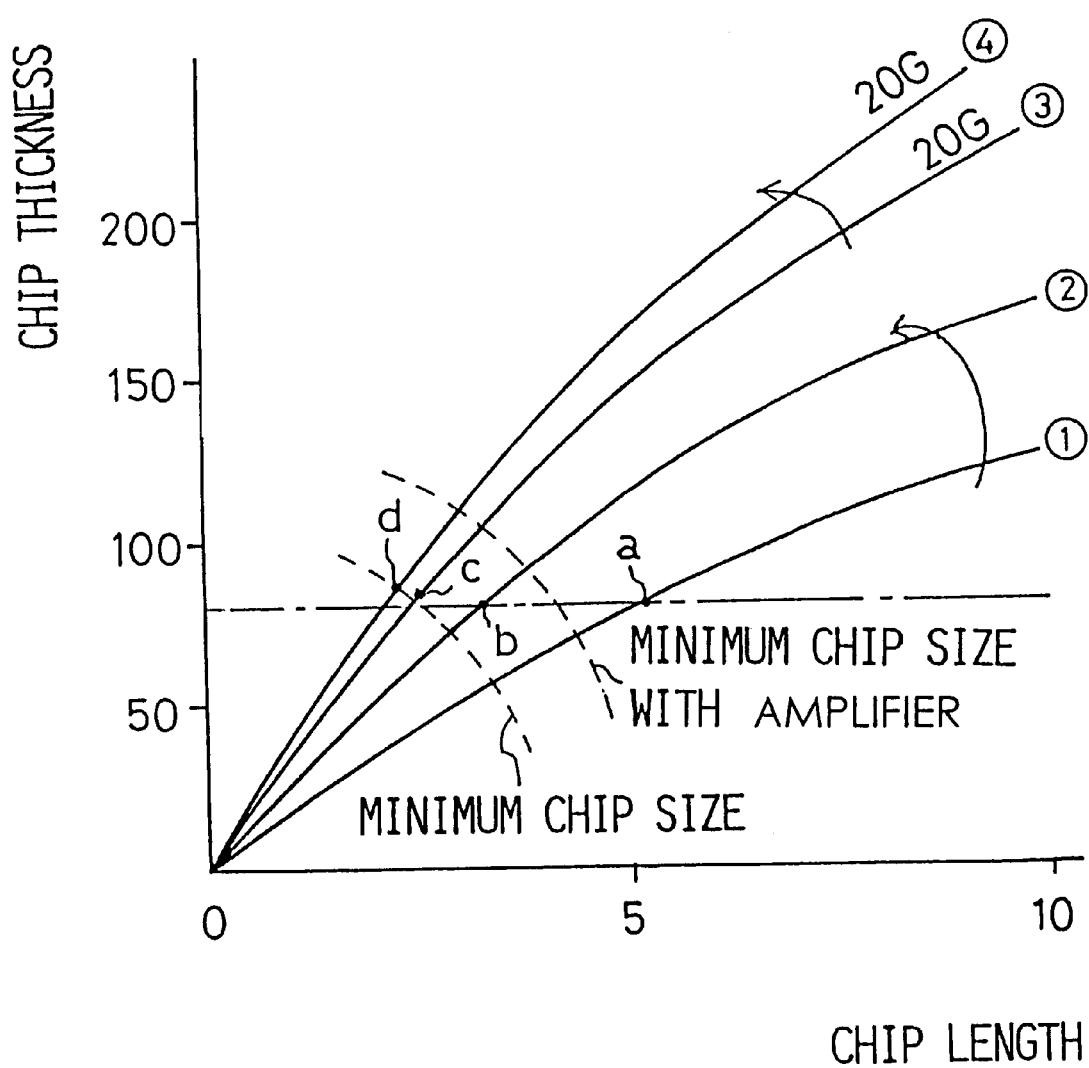
FIG. 48 is a graph explaining a relationship between a chip size and the output sensitivity of the present invention.

Next, a method for determining a structural specification of the acceleration sensor element will be explained. FIG. 48 shows a relationship between a length and thickness of a chip necessary to output the same output with 1 G to 5 G of acceleration for example. The thickness of the chip is determined by a limitation of the manufacturing method by means of dicing (it is necessary to be more than 0.08 mm: a problem of chipping of dicing and a size of an output pad). The solid lines in the figure show sizes of chips for obtaining the outputs to 1 G to 5 G of acceleration.

It is advantageous to include an amplifier circuit because the element is fabricated in the area above a point a of a curve (1) of 1 G in the figure and the chip size area becomes wider. A curve (2) from 1 G to 5 G represents a case when a weight is added. There is a case when it is better to add the weight because an area at which the element cannot be fabricated by including an amplifier circuit like the case of point b. That is, it is in a relationship of trade-off.

However, in cases of high G like a curve (3) (without weight) and a curve (4) (with weight), it just increases the cost to put the weight because the size is determined by the minimum chip size (points c and d).

Note that the output pads described above are arrayed in a row in the longitudinal direction of the sensor at the supporting section of the sensor in connection with the thickness of the sensor.

The semiconductor device including the semiconductor acceleration sensor is manufactured by cutting the elements out of the semiconductor substrate by means of dicing and by forming the element on the side of the cantilever of the semiconductor acceleration sensor in the acceleration detecting direction. At this time, in order to prevent the elements having a very small width from being flown away by a water pressure employed in the dicing, the semiconductor substrate is fixed by a fixing tape having a high adhesive strength and by weakening the adhesive strength by irradiating ultraviolet in taking them out.

An embodiment for forming an electrical circuit within the element having a small chip thickness (width) will be described. The electrical circuit may be installed within the element having the small chip thickness (width) by forming MOS transistors in two rows at top and bottom so that the w-length direction of the source and drain of the MOS transistor is symmetrical about a center line of the sensor in the L-length direction at the sensor section of the sensor. As for the wiring thereof, an aluminum wire electrically connecting the MOS transistors composing the electrical circuit or an aluminum wire electrically connecting the MOS transistor and a poly-silicon forming a resistor section is formed outside of the MOS transistor and the poly-silicon resistor section.

The sensitivity may be enhanced further by forming the diffused resistors by well.

Next, the embodiment of the present invention will be explained with reference to the drawings.

16th Embodiment

Figure 32:
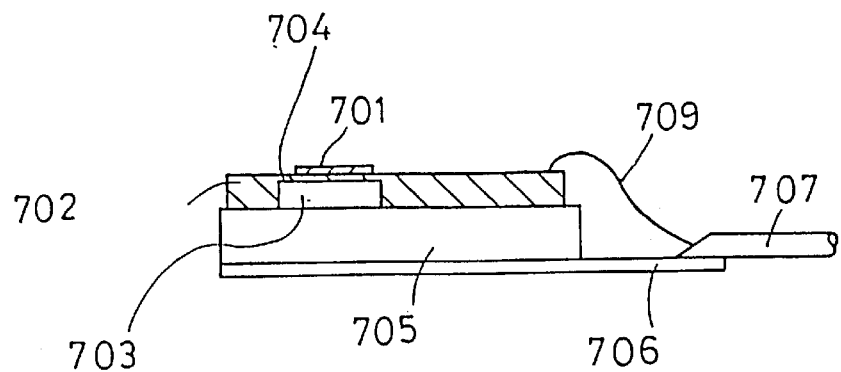
FIG. 32 is a section view showing an embodiment of a semiconductor pressure sensor of the present invention.

FIG. 32 shows the pressure sensor of the present invention.

In FIG. 32, there exist a base 702 having a diaphragm 704 which deforms by a stress and a sensor element 701, disposed on the diaphragm 704, for detecting a displacement by a fluctuation of a resistance value of the diffused resistors. The sensor element 701 comprises a pad section for outputting electrical signals, wiring, temperature compensating circuit and amplifier circuit formed on the side thereof. The output value is output from the base 702 to a terminal 707 added to the package via a wire 709.

Figure 33:
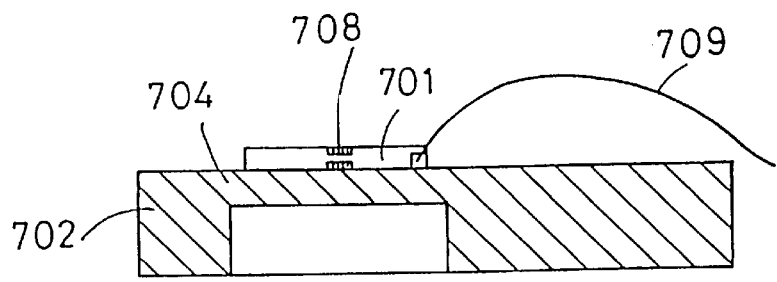
FIG. 33 is a section view showing a pressure detecting section of the embodiment of the semiconductor pressure sensor of the present invention.
Figure 34:
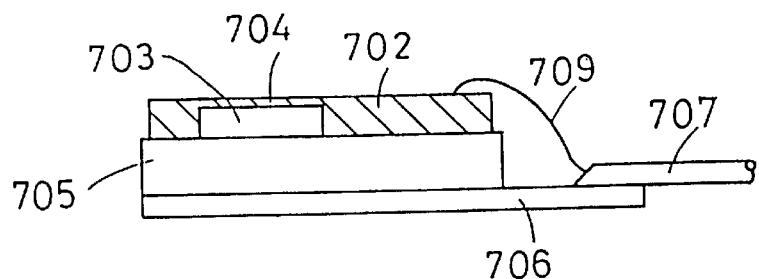
FIG. 34 is a section view of a prior art semiconductor pressure sensor.
Figure 35:
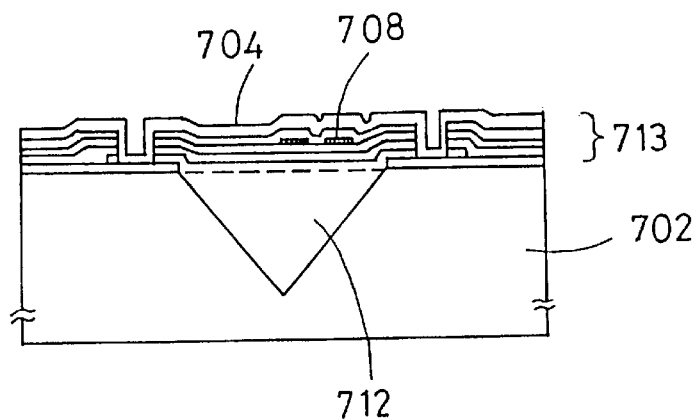
FIG. 35 is a section view of a pressure sensor fabricated by micro-machining of the prior art semiconductor pressure sensor.

FIG. 33 is an enlarged view of the sensor element section, wherein the sensor element 701 having the diffused resistors 708 on the side thereof is disposed on the diaphragm 704 above a pressure reference chamber 703 which changes by a pressure.

Figure 37A:
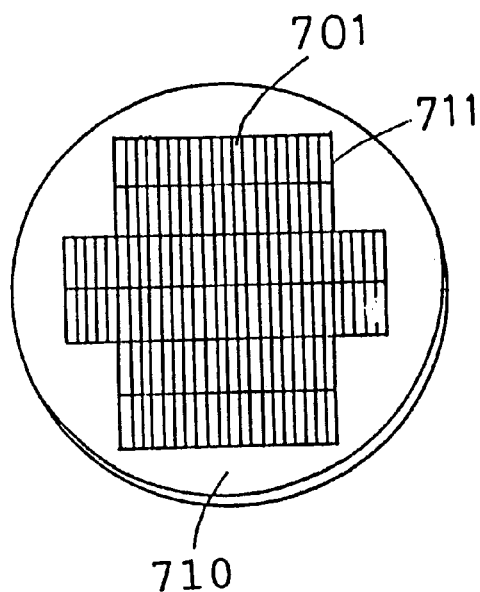
FIGS. 37A–37B are drawings showing a manufacturing process of the semiconductor pressure sensor of the present invention.
Figure 37B:
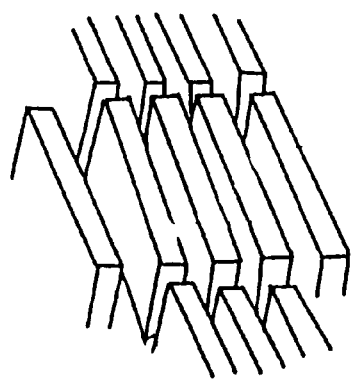
Figure 38:
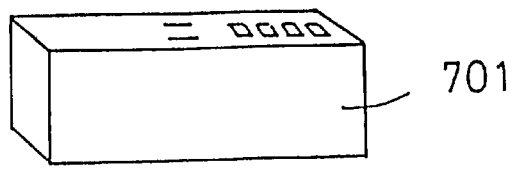
FIG. 38 is a drawing showing a manufacturing process of the semiconductor pressure sensor of the present invention.
Figure 39:
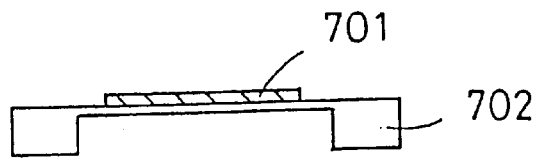
FIG. 39 is a drawing showing a manufacturing process of the semiconductor pressure sensor of the present invention.

FIGS. 37 through 39 show a manufacturing method of the present invention. As shown in FIG. 37, semiconductor elements having the diffused resistor 8 are formed on a semiconductor substrate 710. Next, scribing lines are drawn at the peripheral portion of the sensor element 701 to cut by dicing based on the scribing lines 711. In FIG. 37, they are cut out with a size of 6 mm in length and 0.1 mm in width. FIG. 37B is an enlarged view showing individual elements cut out by means of dicing. That is, this manufacturing method determines a displacement section ($t_o$ in FIG. 45) by dicing (i.e. by diving into individuals). FIG. 38 shows the sensor element 1 fabricated by this method. A height thereof is 0.525 mm which is the thickness of the semiconductor substrate. The dicing allows to readily fabricate elements having a thickness of 0.1 mm.

Next, FIG. 39 shows a state in which the sensor element 701 is bonded to the base 702. In FIG. 39, the sensor element 701 and the base 702 are bonded by a silicon adhesive in order to equalize a thermal expansion coefficient of the base 702 and the sensor element 701 at the bonded section. Such bonding allows to supply a pressure sensor which is not affected by a thermal stress.

Figure 36:
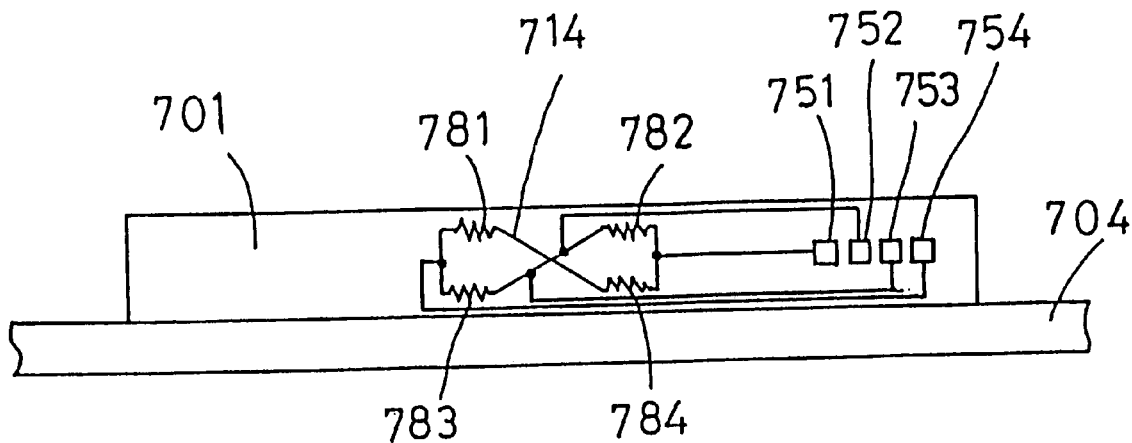
FIG. 36 is a drawing showing an electrical circuit of the semiconductor pressure sensor of the present invention.

Next, the electrical circuit employed in the present invention will be explained with reference to FIG. 36. In FIG. 36, the sensor element 701 comprises at the side thereof a bridge circuit 714 comprising diffused resistors 781, 782, 783 and 784, a ground terminal 751, output terminals 752 and 753 and an input voltage terminal 754 and the sensor element 701 is bonded to the diaphragm 704. When the sensor element 1 is displaced, compression and tensile stresses are applied to the upper and lower ends of the sensor element 701 and are detected by the bridge circuit 714 by the diffused resistors and an output of a difference between the compression and tensile stresses is output from an output pad 703.

Now an advantage of having the diffused resistors 708 on the side of the sensor element will be explained. In the prior art case when the diffused resistors are disposed on a plan, a bridge circuit having a reference resistor $R_2$ and a measuring resistor $R_1$ is formed. When $R_2$ is R, $R_1$ may be represented as R+$\Delta$R. An output $V_{OUT}$ at this time may be represented by the following equation:

$$V_1 = (R/2R+\Delta R)V \quad (5)$$

$$V_2 = (R+\Delta R/2R+\Delta R)V \quad (6)$$

$$V_{out} = V_2 - V_1 = (\Delta R/2R+\Delta R)V \quad (7)$$

In the electrical circuit of the present invention, when $R_1$ has a resistance value caused by the compression stress R+$\Delta$R and $R_2$ has a resistance value caused by the tensile stress R–$\Delta$R, the output $V_{OUT}$ may be represented by the following equation:

$$V_1 = (R-VR/2R)V \quad (8)$$

$$V_2 = (R+\Delta R/2R)V \quad (9)$$

$$V_{out} = V_2 - V_1 = (\Delta R/R)V \quad (10)$$

When $\Delta$R is neglected as being a very small value from the equations (7) and (10), the electrical circuit of the present invention has two times of output as compared to the prior art circuit.

In the present invention, a semiconductor acceleration sensor having 6 mm in length, 0.525 mm in width and 0.1 mm in thickness has been fabricated. When 5 V of voltage was applied to the semiconductor acceleration sensor, an output voltage thereof was 1.4 mV. It should be noted that this output value was obtained without undergoing the amplifier circuit.

17th Embodiment

Figure 40:
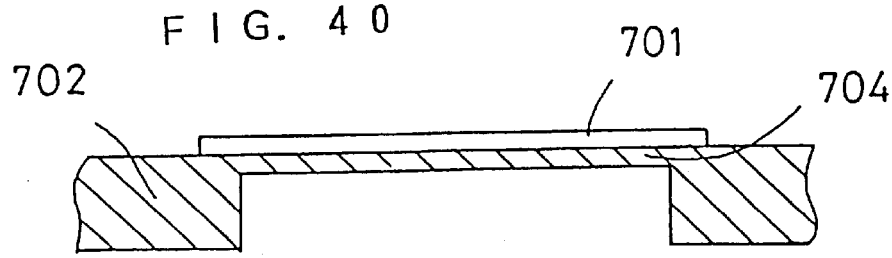
FIG. 40 is an explanatory drawing showing an operation of a sensor element of the present invention.
Figure 41A:
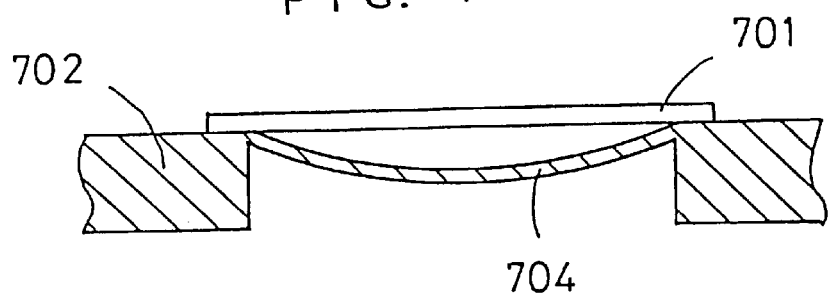
Figure 41B:
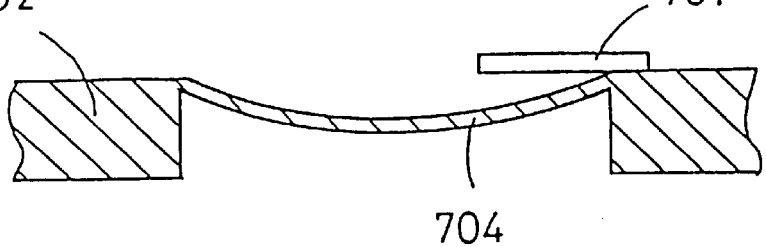
Figure 42A:
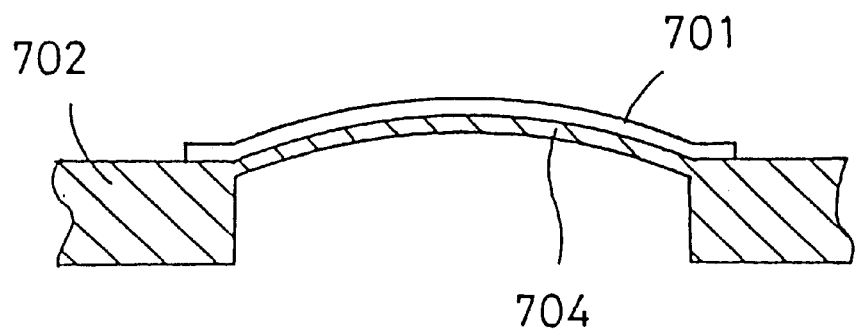

FIGS. 40 through 42 show an embodiment in which only the edge of the sensor element 701 is fixed. In FIG. 40, the sensor element 701 is bonded to a portion of the base 702 not having the diaphragm 704. FIG. 40 shows a state when pressures of the pressure reference chamber 703 and the outside are balanced. FIG. 41 shows a state when the ambient pressure is higher than the reference pressure. Although the diaphragm 704 deforms, the sensor element 701 is supported by the edge and detects no displacement caused by the pressure. However, when the ambient pressure is lower than the reference pressure, both of the diaphragm 704 and the sensor element 701 deform as shown in FIG. 42. Thereby, only the pressure which is lower than that of the pressure reference chamber may be detected.

Figure 42B:
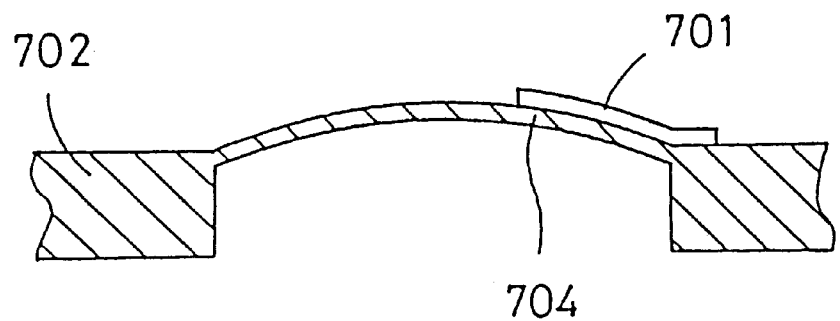

An embodiment in which only one edge of the sensor element is fixed as shown in FIGS. 41B and 42B will be described. In FIG. 41B, while the diaphragm 704 deforms when the ambient pressure is higher than the reference pressure, the sensor element 701 is supported by the edge and detect no displacement caused by the pressure. In FIG. 42B in which the ambient pressure is lower than the reference pressure, both of the diaphragm 704 and the sensor element 701 deform as shown in the figure. Thereby, only the pressure which is lower than that of the pressure reference chamber may be detected.

A method for enhancing the sensitivity of the present invention will be described. In the manufacturing method of the present invention shown in FIG. 37, the sensor element 701 is thinned by polishing from the side of the sensor element 701 after installing the sensor element 701 on the silicon base 702. Thereby, the sensitivity of the sensor element 701 of the present invention is enhanced.

18th Embodiment

Figure 43:
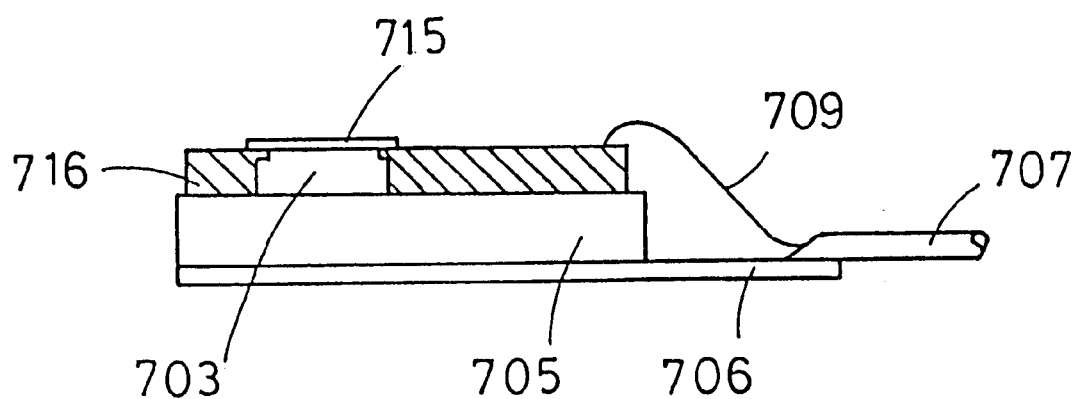
FIG. 43 is a section view of the embodiment of the semiconductor pressure sensor of the present invention.
Figure 44:
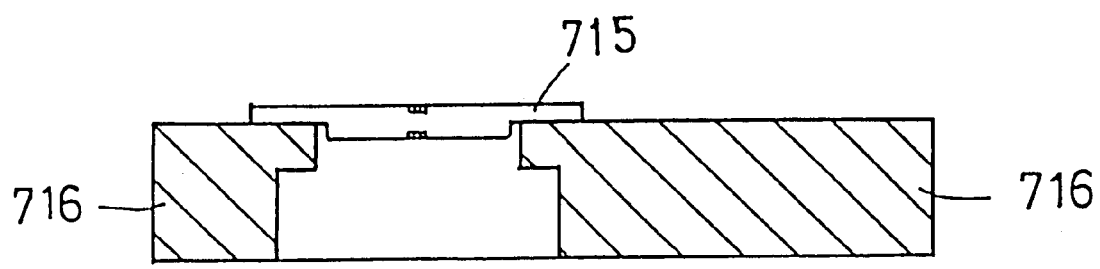
FIG. 44 is a section view showing the pressure detecting section of the embodiment of the semiconductor pressure sensor of the present invention.

FIG. 43 shows a front view of an 18th embodiment of the present invention. FIG. 44 shows a pressure detecting section of the 18th embodiment. As detecting means, an opening is formed on a base 716 to engage it with a sensor element 715.

Thereby, the base 716 requires no etching process to form a diaphragm, allowing reduction of the manufacturing process and an improvement of a yield of the base.

19th Embodiment

Figure 49:
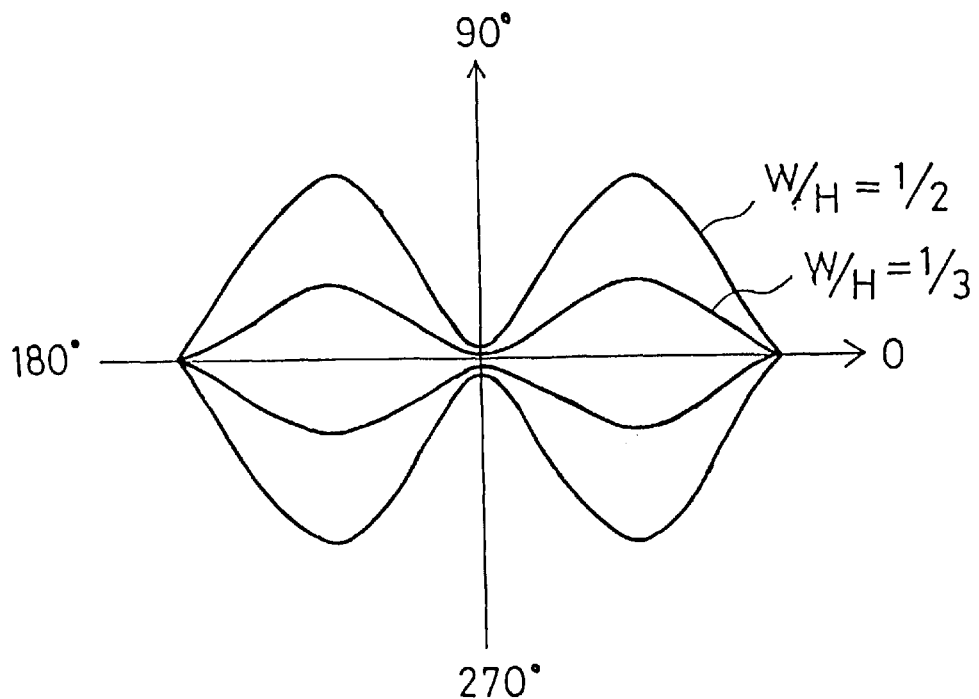
FIG. 49 is a graph showing an output voltage from 0° to 360° according to the present invention.
Figure 50:
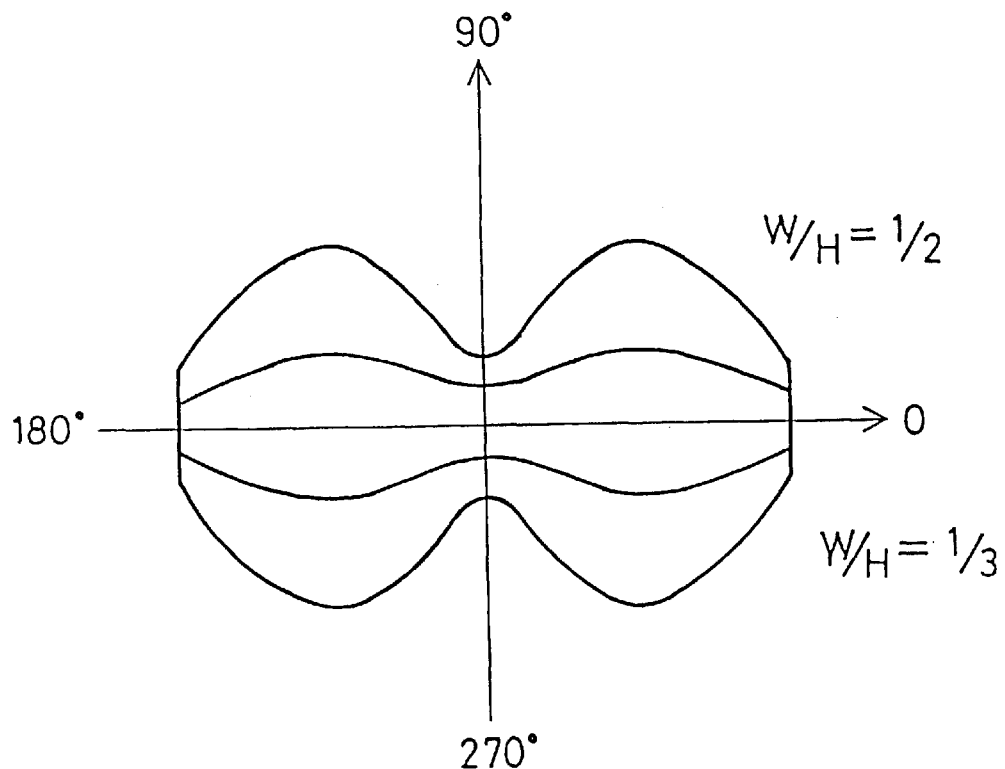
FIG. 50 is a graph showing an output voltage from 0° to 360° according to the prior art.

FIGS. 49 and 50 show examples of output of voltages per each angle of the acceleration sensor utilizing the present invention, wherein FIG. 49 shows the example of output of voltage when the pillar shape sensor element of the present invention is used and FIG. 50 shows the example of output of voltages when the etching process of the past is utilized. Lines in the figure represent ratios of width and thickness of the element (W/H=1/2, 1/3). Because the etched section is apt to twist in the case of the prior art structure, a change of resistance due to the twist is brought about, outputting a voltage. Due to that, the lines are not tied at the center of the output 0 as shown in FIG. 50. In order to remove a noise component caused by the structure of this part, it is necessary to take a removing method by means of an electrical circuit.

Figure 51:
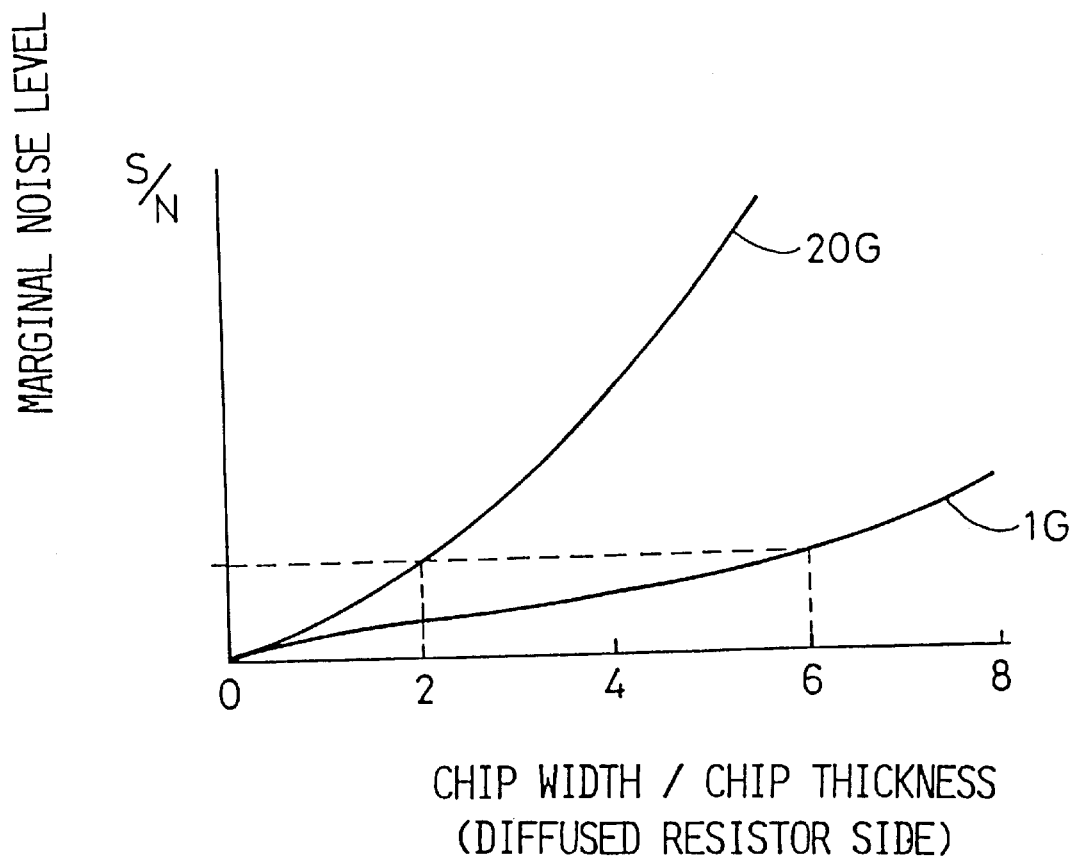
FIG. 51 is a graph explaining a relationship among chip width, chip thickness and S/N according to the present invention.

FIG. 51 shows a relationship of the width/height (W/H) of the pillar structure using the acceleration sensor of the present invention. The horizontal axis represents the chip width/chip thickness and the vertical axis represents the noise level. For 1 G, if the relationship of the chip width/chip thickness is less than 6, the element can be used well since the noise level is small. For 20 G, a sensor having a better precision may be supplied because it is not affected by the twist if the relationship is less than 2.

20th Embodiment

A case when a biaxial sensor is used will be explained. When the chip width of the pillar (rectangular parallelepiped) acceleration sensor of the present invention is reduced, a change of resistance due to a displacement is caused also from the side of the diffused resistors. A biaxial acceleration sensor of the present invention utilizes this principle. This will be explained with reference to FIGS. 52, 53, 54 and 55.

Figure 54:
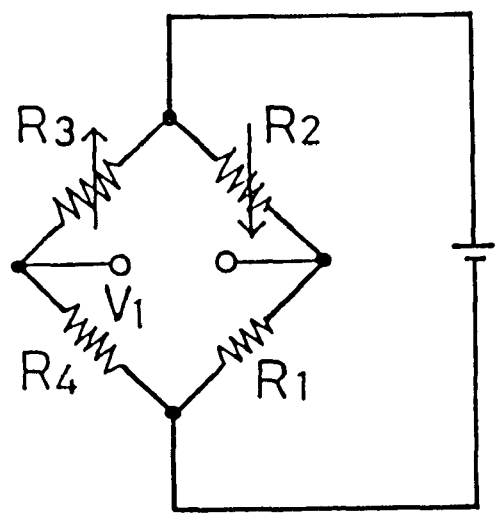
FIG. 54 is a diagram for explaining a bridge circuit of the biaxial sensor of the present invention.
Figure 55:
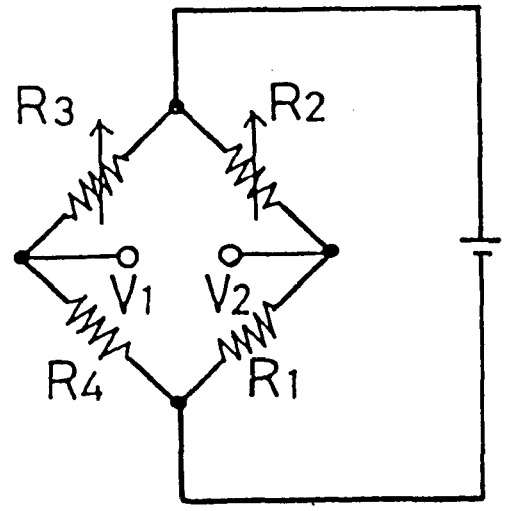
FIG. 55 is a diagram for explaining the bridge circuit of the biaxial sensor of the present invention.

When the diffused resistors are provided on the side where an acceleration is detected according to the present invention, two times of output can be obtained as compared to the prior art example as described before. However, when the biaxial sensor is used, while the chip width of the pillar (rectangular parallelepiped) acceleration sensor of the present invention needs to be reduced, the output is small with respect to acceleration from the diffused-resistors side with the arrangement of the diffused resistors in the bridge circuit shown in FIG. 53 (the bridge circuit is shown in FIG. 54). Then, in order to obtain an acceleration sensor having a higher sensitivity in fabricating as the biaxial sensor, a method in which the diffused resistors (R1 and R4 in FIG. 55) in the vicinity of the supporting base are designated as reference resistors is adopted. FIG. 52 shows examples of outputs at that time, wherein 01 represents an output pattern from the acceleration detecting direction and 02 represents an output from the side of the diffused resistors. A difference of the output shapes of 01 and 02 comes from a difference of displacements applied to the diffused resistors described above. The biaxial acceleration sensor is obtained by adjusting output sensitivities of the both axes by adjusting the difference of the displacements. Although the adjustment of the output sensitivity has been performed by trimming in the present embodiment, it is also possible to achieve the purpose by adjusting the relationship of chip width/chip thickness. FIG. 52 also shows curves 01' and 02' (dotted lines) after the adjustment. From this result, homogeneous outputs are output from the both axes, allowing to use as the biaxial sensor.

21st Embodiment

Figure 56:
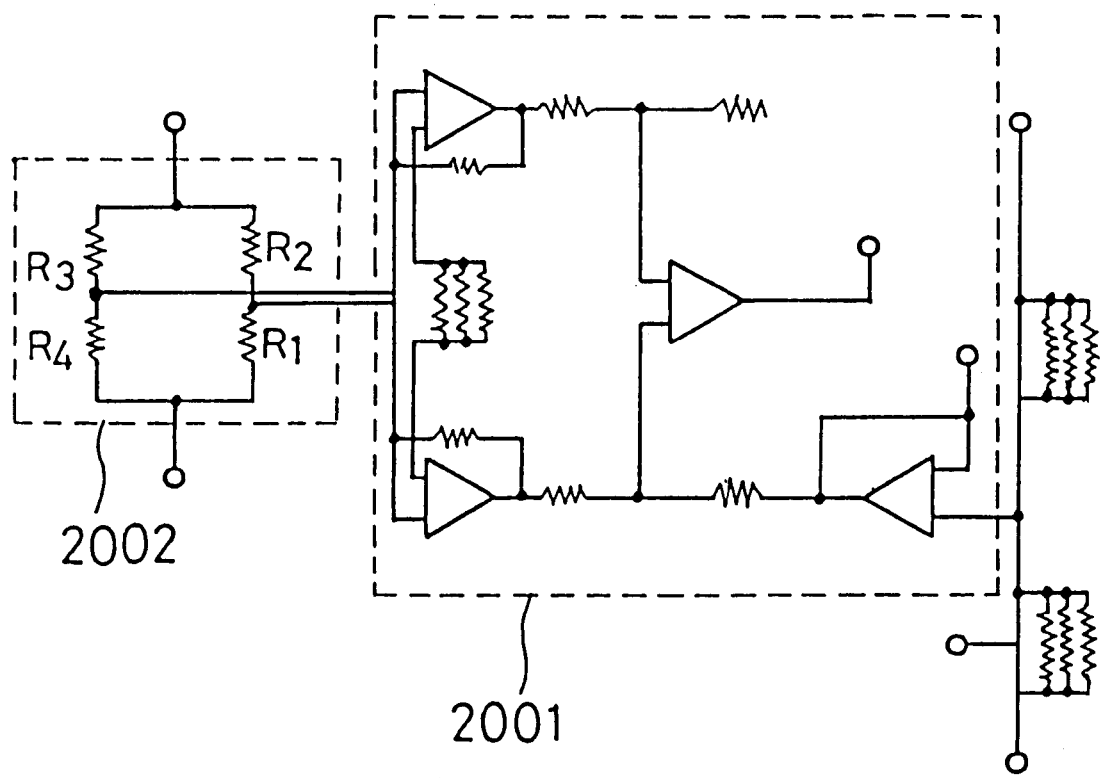
FIG. 56 is an electrical circuit diagram of the present invention.

The detail of the fabricated semiconductor acceleration sensor will be explained in the present embodiment. An electrical circuit including an amplifier circuit will be explained with reference to FIG. 56. A full bridge circuit 2002 is structured as the electrical circuit. A resistance value of a piezo resistance gage changes in response to a strain caused by an acceleration and the bridge circuit 2002 detects it as a voltage change. Differential outputs of the sensor are converted into single output by a differential amplifier circuit 2001 in which three CMOS single-powered operational amplifiers with a single end are arranged. Note that the differential amplifier circuit includes trimming circuits for adjusting sensitivity and for adjusting offset via a buffer. In the present embodiment, the sensor was fabricated with a size of 12 mm in whole length including the supporting section and of 0.16 mm in width including the amplifier circuit.

It is also possible to improve S/N by using two whole differential amplifier single ends and a chopper amplifier.

Figure 57:
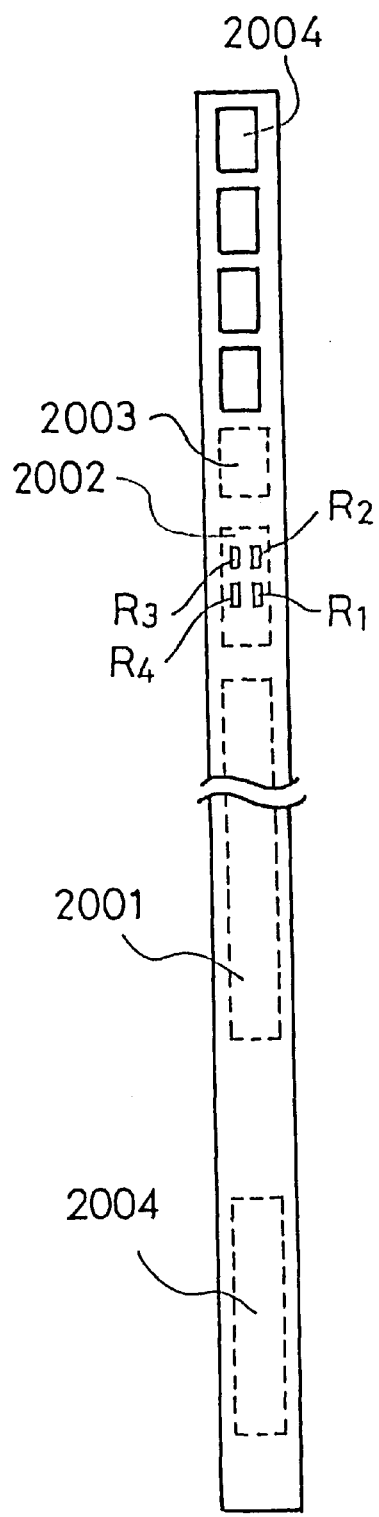

FIG. 57 is a plan view showing a layout of the electrical circuit of the semiconductor acceleration sensor of the present invention. The electrical circuit includes an output pad section 2004, the bridge circuit (piezo resistors) 2002, an operational amplifier section 2001 and a bias circuit section. The following points are noted as described before in the layout of the area having a narrow width. That is, the electrical circuit could be installed in the element having a small chip thickness (width) by forming MOS transistors in two rows at the top and bottom so that w-length direction of the source and drain of the MOS transistor is symmetrical about a center line in the L-length direction of the sensor at the sensor section of the sensor. As for the wiring, aluminum wires electrically connecting the MOS transistors which compose the electrical circuit or aluminum wires electrically connecting the MOS transistors and a poly-silicon forming the resistor section is formed outside of the MOS transistors or the poly-silicon resistor section.

22nd Embodiment

Figure 58:
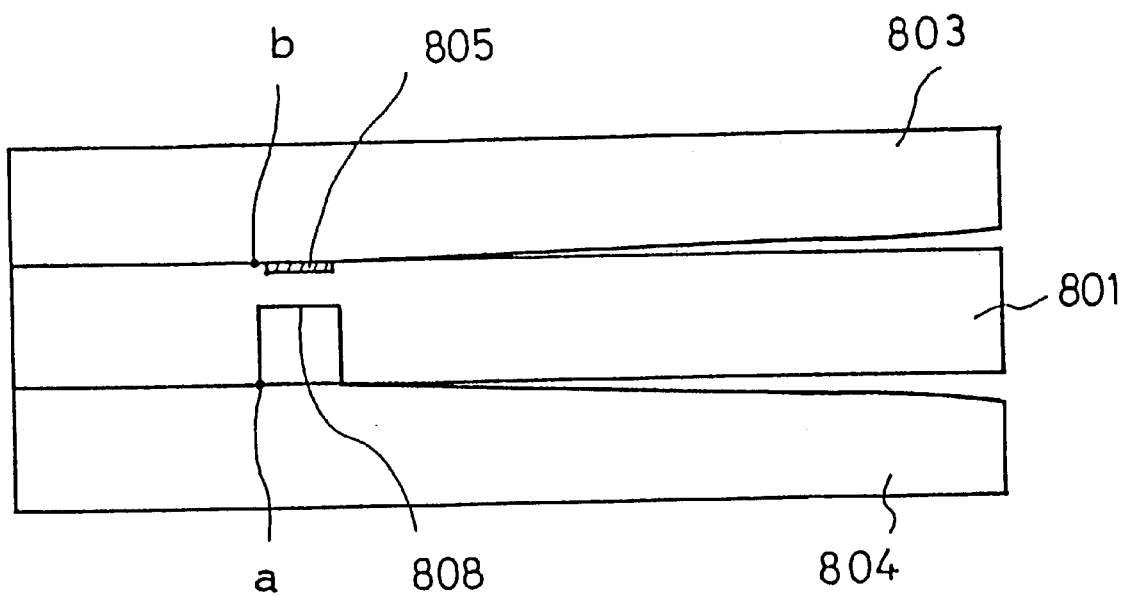
FIG. 58 is a section view of the semiconductor acceleration sensor of the present invention.
Figure 59A:
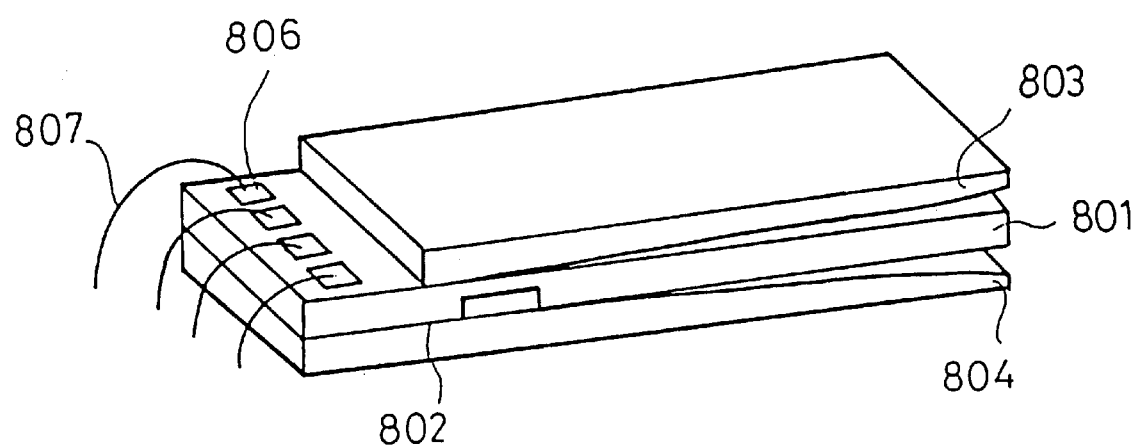
FIGS. 59A–59B are perspective views of the semiconductor acceleration sensor of the present invention.
Figure 59B:
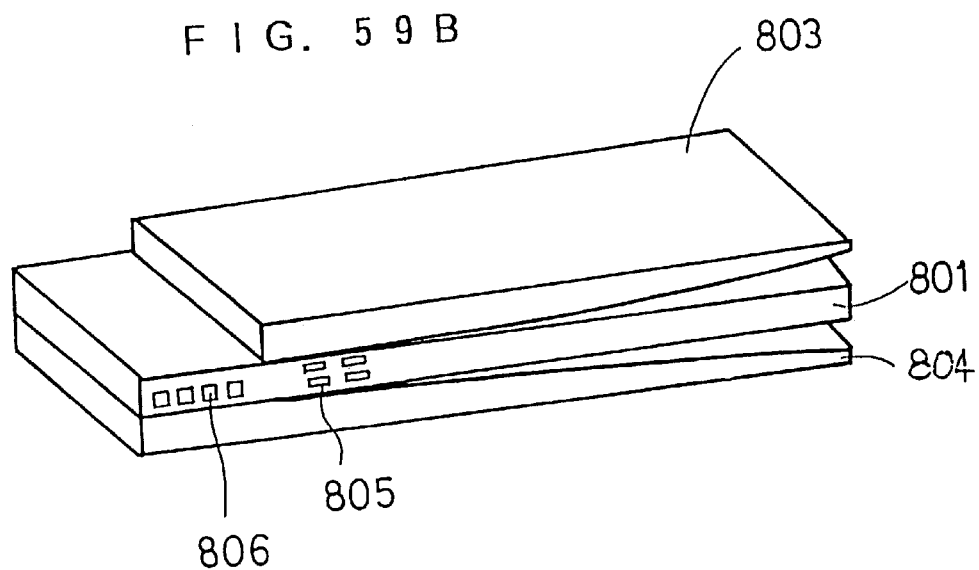
Figure 60:
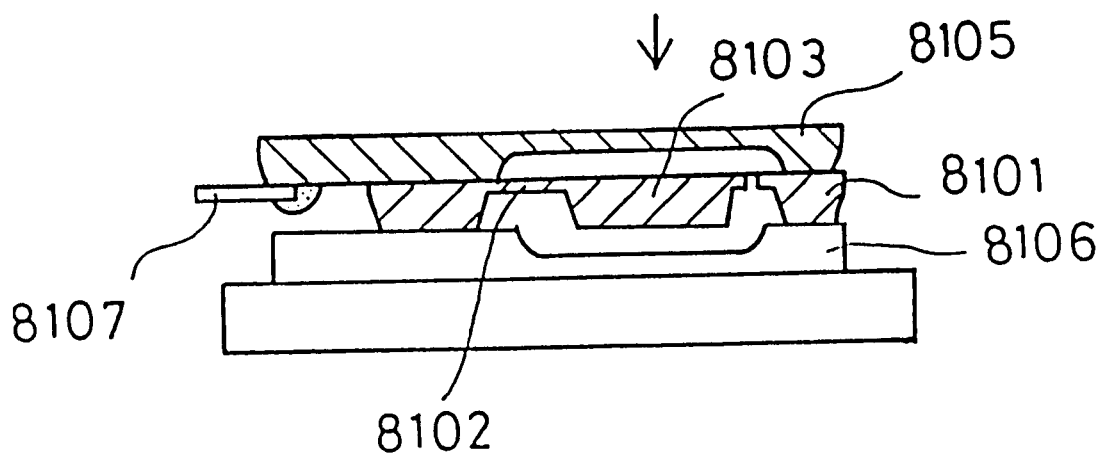
FIG. 60 is a section view of the prior art semiconductor acceleration sensor.

FIG. 58 is a section view of the semiconductor acceleration sensor of the present invention. FIG. 59 is a perspective view of the semiconductor acceleration sensor of the present invention. FIG. 59B is a perspective view when the diffused resistors are located on the side in the acceleration detecting direction.

In FIG. 58, a thin section is formed on a silicon base 801 whose material is silicon and diffused resistor 805 for converting a stress caused by a displacement into an electrical signal is provided. An upper stopper 803 and a lower stopper 804 for preventing a destruction when an excessive acceleration is brought about are provided at the top and bottom of the base 801. Beside the diffused resistor 805, pad sections 806 for outputting an output value, wirings, a temperature compensating circuit and amplifier circuit are disposed on the side of the base 801. The output value is output from terminals added to the package via wires 807 from the base 801.

The surface of the stopper contacting with the silicon base is fabricated so as to have a curved face conforming to the equation (1) of deflection curve described before since the cantilever is used in the present embodiment. The upper and lower curved faces are made to be same.

Contact points of the silicon base and the stoppers are a portion a and a portion b on the portion a in the figure at the edge of the groove section 808 having the diffused resistors shown in FIG. 58. A maximum gap between the silicon base and the stopper is created so that an acceleration to be detected can be detected by providing a distance more or less ideally from a displacement of the silicon base when a specified acceleration is detected.

Next, a mechanism for preventing the destruction of the semiconductor acceleration sensor of the present invention will be explained with reference to FIGS. 64, 65 and 66.

FIG. 64 shows a case when the silicon base 801 has received an acceleration from the bottom and displaced upward. In this case, the base 801 displaced along the inner surface of the upper stopper 803 and could withstand to a shock, receiving no partial shock. FIG. 65 shows a state in which no acceleration is applied. FIG. 66 shows a case when the cantilever base 801 has received an acceleration from the top and displaced downward. In this case, the base 801 displaced along the inner surface of the lower stopper.

An experiment of a shock resistance of the semiconductor acceleration sensor of the present invention was carried out. The size of the sensor section of the semiconductor acceleration sensor of the present invention was 8 mm in length, 1 mm in width and 0.6 mm in thickness. A thickness of the diffused resistor section was 80 µm. When the semiconductor acceleration sensor having such specifications receives a shock of 100 G for example, the distal end of the semiconductor acceleration sensor displaces 12 µm in maximum. Because this semiconductor acceleration sensor is used to detect a gravity, its specification was designed to detect an acceleration of 1 G. The maximum displacement of the semiconductor acceleration sensor at that time is less than 1 µm. Due to that, although 2 µm will be enough as the gap between the acceleration sensor at the distal end which displaces most and the stopper as the structure of the stopper for enhancing the shock resistance, it is difficult to manufacture and the acceleration sensor of the present invention was formed creating a gap of 10 µm. The surface of the stopper contacting with the silicon base was fabricated so as to have curved shape conforming to the equation of deflection curve.

The stopper was fixed with the acceleration sensor by using an adhesive made from the same composition with the material used in the present invention in order to match the thermal expansion coefficients of the stopper and the acceleration sensor. This method allowed to prevent an influence of thermal stress on the diffused resistors and to prevent an effect of temperature drift.

When the shock resistance of the acceleration sensor of the present invention was measured, the acceleration sensor of the present invention was not destroyed even a shock of 3,000 G was applied.

23rd Embodiment

Figure 67:
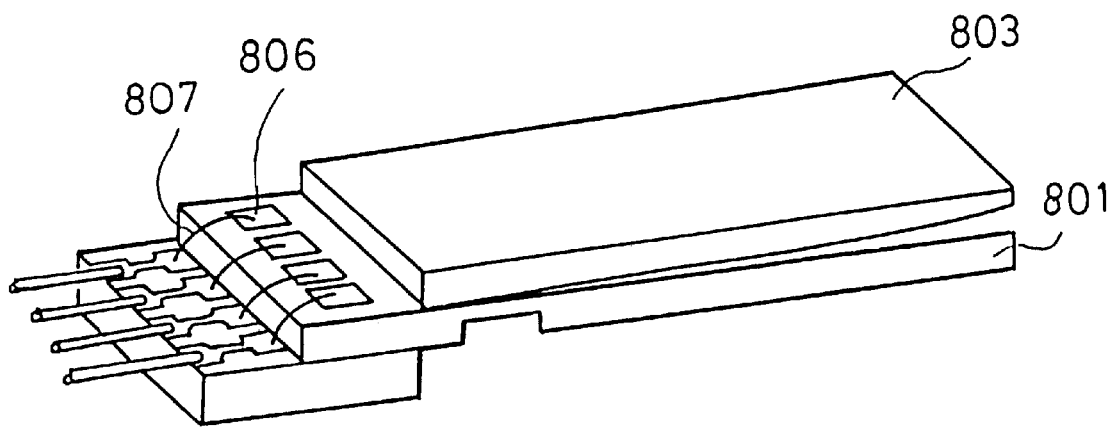
FIG. 67 is a perspective view of a semiconductor acceleration sensor according to a second embodiment of the present invention.

FIG. 67 is a perspective view of a 22nd embodiment of the present invention. In the present embodiment, silicon is used for a detecting section of the acceleration sensor. Silicon is an excellent material as a spring member and shows a good spring characteristic. When a cut is created at the lower part of its cantilever and diffused resistors are provided at the upper part thereof, a downward displacement can be large, though upward displacement is small. Then, a stopper is provided only above the diffused resistors in the present embodiment. The shock resistance could be improved even with such structure. This has an effect of reducing the production cost.

24th Embodiment

Figure 68:
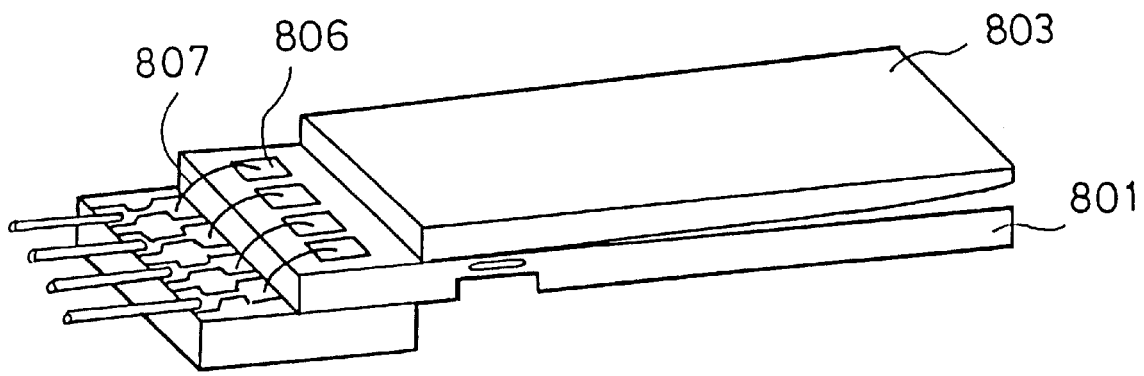
FIG. 68 is a perspective view of a semiconductor acceleration sensor according to a third embodiment of the present invention.

FIG. 68 is a perspective view of a 24th embodiment of the present invention. In the present embodiment, the diffused resistors 805 for detecting a displacement are formed on the side in the direction displaced by an acceleration. When the diffused resistors are formed on the side, it becomes possible to prevent a thermal stress from being generated on the diffused resistors by the stopper and from causing an effect of temperature drift. In the case of the present invention in which the diffused resistors for detecting a displacement are located on the side, contact points of the stopper for preventing destruction and the silicon base are disposed in the vicinity of the diffused resistors.

The diffused resistor section is not thinned like the 22nd and 23rd embodiments in the present embodiment and an enhancement of the shock resistance is expected further by the present embodiment. By the present embodiment, the shock resistance of the semiconductor acceleration sensor having 8 mm in length, 1 mm in width and 0.2 mm in height improved to 4,000 G.

25th Embodiment

An embodiment constructed so that the diffused resistor side faces to the supporting substrate will be explained in a 25th embodiment.

Figure 69A:
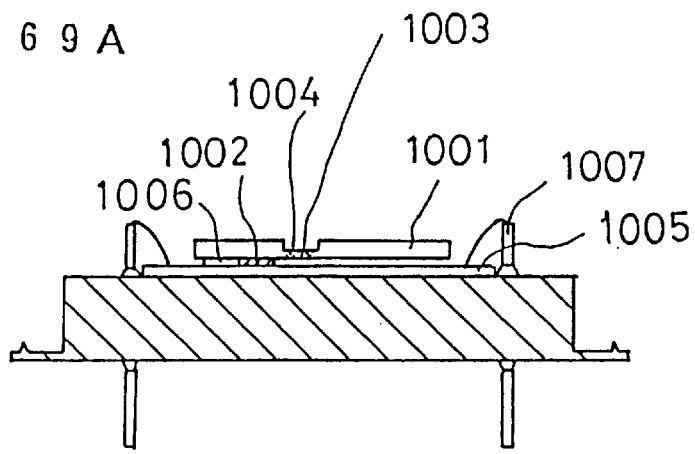
FIGS. 69A and 69B show front and perspective views of the embodiment of the semiconductor acceleration sensor of the present invention.
Figure 69B:
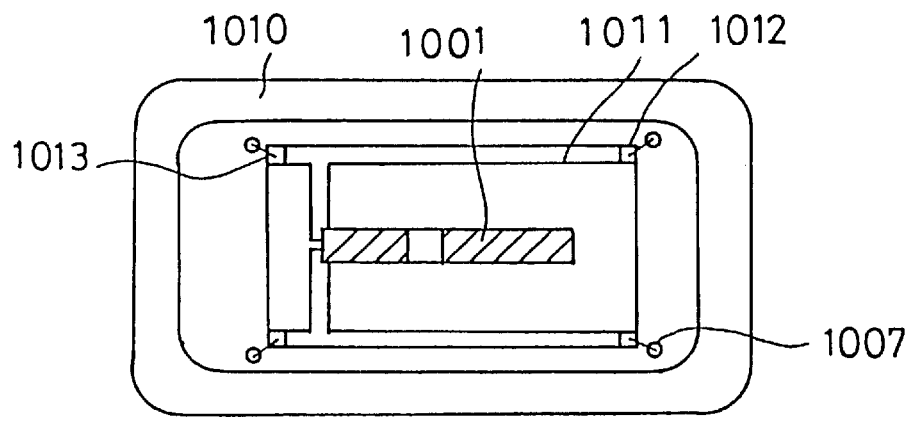
Figure 70:
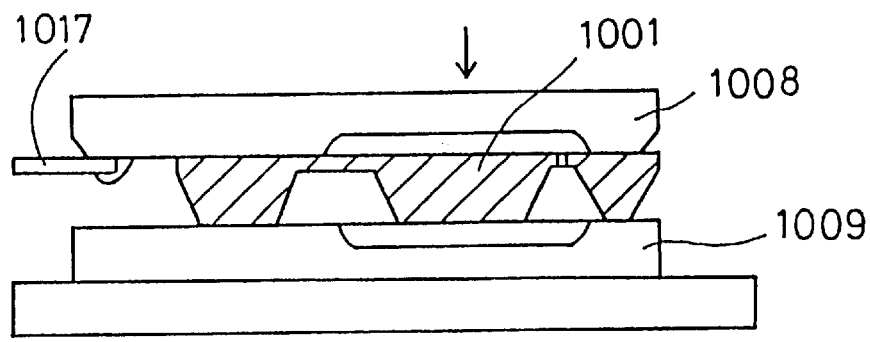
FIG. 70 is a front view of the prior art semiconductor acceleration sensor.
Figure 73A:
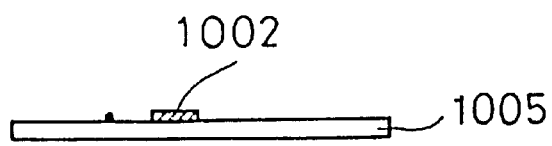
FIGS. 73A–73E are explanatory drawings showing a manufacturing method of the semiconductor acceleration sensor according to a 26th embodiment of the present invention.
Figure 73D:
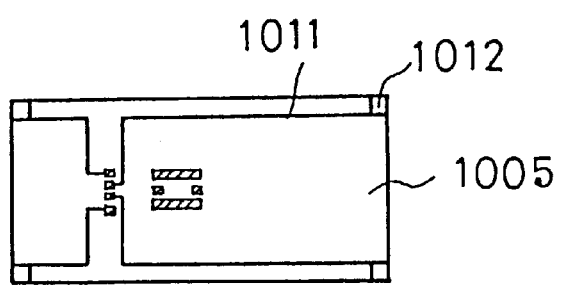
Figure 73B:
Figure 73E:
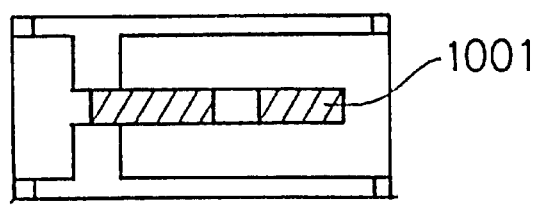
Figure 73C:
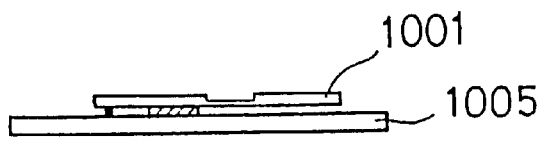

FIG. 69 shows the embodiment of the semiconductor acceleration sensor of the present invention, wherein FIG. 69A is a front view and FIG. 69B is a plan view thereof.

The structure will be explained with reference to FIG. 69. A thin section 1004 is formed on a silicon base whose material is silicon and diffused resistors 1003 for converting a stress caused by a displacement into an electrical signal is provided on that. The cantilever acceleration sensor element 1001 is installed so that the diffused resistor side faces to a wiring board 5. Solder bumps 1006 are formed at a part 1002 (pedestal), which would become a supporter and a terminal for outputting electrical signals, in advance by a solder bump process on the acceleration sensor element 1 to be able to readily construct the sensor by installing the acceleration sensor element 1 on the wiring board 5.

A manufacturing process of the acceleration sensor of the present invention will be explained with reference to FIG. 71.

FIGS. 71A through 71C are front views and FIGS. 71D and 71E are plan views.

At first, the wiring board 1005 for leading electrical signals from a terminal 1007 provided on a package 1010 for protecting the acceleration sensor and for holding the acceleration sensor element 1 is fabricated. In the present invention, a wiring 1011 was fabricated by a gold wire (chrome base) on a glass. A thickness of the wiring film was 1000 angstrom with chrome and 1000 angstrom with gold and the film was formed by sputtering. A pedestal pattern for supporting a terminal 1010, the wiring 1011 and the acceleration sensor element 1001 was formed within the wiring pattern.

Next, the acceleration sensor element 1001 was fabricated by forming the diffused resistors by normal ion implantation or the like and by means of semiconductor processes of forming wiring and insulating films. The amplifier circuit and the temperature compensating circuit are formed as necessary. In the present embodiment, in order to provide the pedestal 1002 which is installed to the wiring board 1005 to the acceleration sensor element 1001 itself, the solder bump process was implemented and the pedestal was formed on the element itself. The acceleration sensor element 1001 is installed on the wiring board 1005 by forming the pedestal by the solder bump process. Because the gold wire is used for the pattern within the wiring board, it conforms well with the solder, the acceleration sensor element 1001 may be bound to the wiring board 1005 readily by increasing a temperature up to about 200° C.

The present method also allows to locate accurately by its self-alignment function. Because the gap between the acceleration sensor element 1001 and the wiring board 1005 needs to be held here, a base copper pattern fabricated when the solder bump is formed is used in the present embodiment. A thickness of the copper pattern is used to control the gap between the acceleration sensor element 1001 and the wiring board 1005. Since the copper pattern is formed by plating gold, the gap can be controlled in order of micron.

In the present embodiment, the acceleration sensor was fabricated to use to detect an acceleration of 1 G accurately.

Because its maximum displacement was less than 10 micron, it was fabricated so as to have 10 micron as a thickness of copper plating. A solder 1014 is reflown at 200° C. to bond the acceleration sensor element 1001 with the wiring board 1005. The solder flows out to the gold pattern on the wiring board and the gap is formed and held by the remaining copper. The acceleration sensor having the completed board is adhered with the case 1010, the terminals 7 provided on the package 1010 are connected by wire bonding 1013 and a lid of the package 1010 is adhered, thus completing the acceleration sensor.

When the shock resistance of the acceleration sensor fabricated in the present embodiment was measured, the acceleration sensor of the present invention was not destroyed even when a shock of 4,000 G was applied.

26th Embodiment

The case in which the solder bump 1006 is formed on the acceleration sensor element 1001 as a pedestal for holding it has been described in the 25th embodiment. In a 26th embodiment, the sensor was fabricated by forming the solder bump on the wiring board 1005 and by fixing the acceleration sensor element 1001 to that.

This will be explained with reference to FIG. 73.

Figure 74:
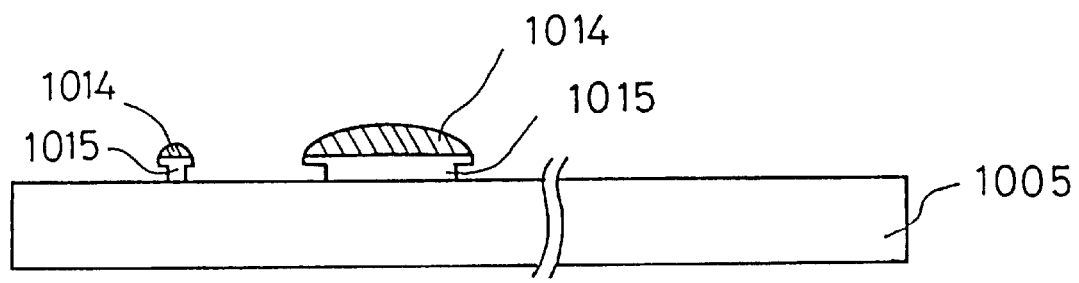
FIG. 74 is a drawing showing a manufacturing process of the semiconductor acceleration sensor of the present invention.

At first, as a first step, a chrome film is formed on the whole surface of a glass substrate, a copper film is formed thereon and then wiring is formed by lithographic process. As a second step, the pedestal for fixing the acceleration sensor element 1 and a solder bump on the pad for taking out electrical signals from the acceleration sensor element 1 are formed. The wiring board 5 is fabricated by these steps. FIG. 74 is an enlarged view of the pedestal 1002 and the output pad formed by the solder bump process.

As for the acceleration sensor element 1001, the diffused resistors 1003 and the amplifier circuit are formed in advance in the semiconductor process. The thin section for enhancing the sensitivity may be formed by etching. As a third step, the wiring board 1005 is fixed with the acceleration sensor element 1001 fabricated by the semiconductor process.

The method for fixing the wiring board 1005 with the acceleration sensor element 1001 fabricated by the semiconductor process will be explained with reference to FIGS. 74 and 75.

Figure 75:
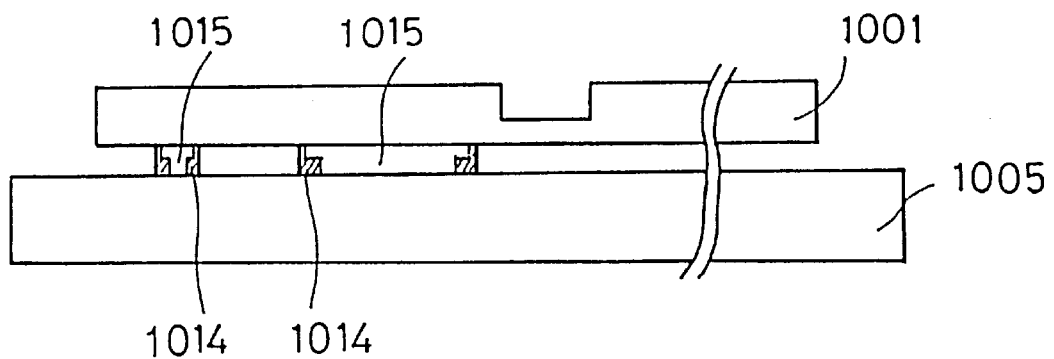
FIG. 75 is an explanatory drawing showing a manufacturing method of the semiconductor acceleration sensor of the present invention.
Figure 76A:
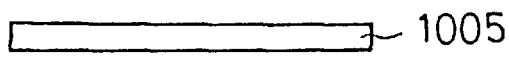
FIGS. 76A–76F are explanatory drawings showing a manufacturing method of the semiconductor acceleration sensor according to a 27th embodiment of the present invention.
Figure 76D:
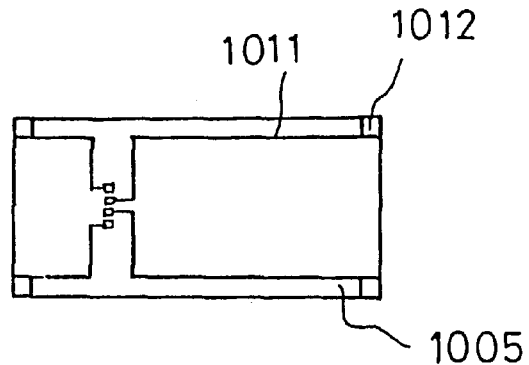
Figure 76B:
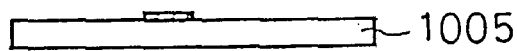
Figure 76E:
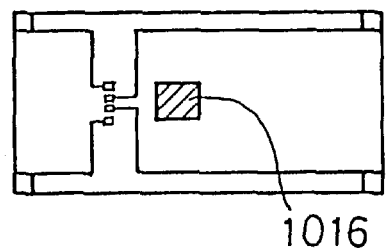
Figure 76C:
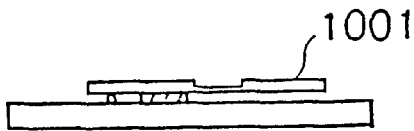
Figure 76F:
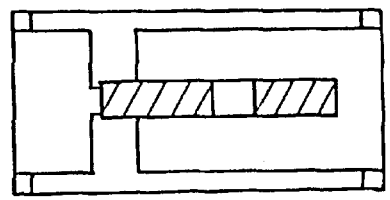

The 1001 is placed on the wiring board 1005 formed as shown in FIG. 105 (shown in FIG. 75). When it is heated up to 200° C. after that, the solder 1014 flows out. The solder 1014 flows out to metal portions patterned on the acceleration sensor element in advance and is positioned and fixed by the self-alignment. The wiring board 1005 equipped with the acceleration sensor element 1 is fixed within the package 1010 and terminals 1013 within the wiring board 1005 are connected with the terminals 1007 provided on the package by wire bonding to be able to supply electrical signals to the outside. The fabricated of the acceleration sensor is completed by liding and by sealing it on the package 1010.

27th Embodiment

While the solder bump process has been employed as the method for forming the pedestal both in the 25th and 26th embodiments, a thick-film resist 1016 is used to form the pedestal in a 27th embodiment.

A process for forming the pedestal by the resist 1016 will be explained with reference to FIG. 76. As a first process, a wiring layer is formed on a substrate (e.g. a glass) by using a wiring material (aluminum in the present embodiment) and a desired wiring pattern is formed on the substrate 5 by a lithographic process. As a second process, the thick-film resist 1016 is formed by spin-coating.

At that time, it is necessary to control the application of the resist to have an equal thickness since the thickness of the resist is important for a shock resistant structure. Next, patterning is performed to obtain a pedestal shape. As a third step, the acceleration sensor element 1001 is fixed. After that, reflow is performed to connect output terminals. The acceleration sensor may be readily fabricated by using the thick-film resist 1016. When a shock resistance of the acceleration sensor of the present embodiment was evaluated, it could sustain to a shock of 4,000 G.

28th Embodiment

An embodiment when an element having diffused resistors on the side in an acceleration detecting direction is mounted so that the diffused resistors face to the supporting substrate will be explained. Similarly to the 25th embodiment, the solder bumps 1006 are formed in advance at the portion 1002 (pedestal) which becomes the supporter and at the electrical signal terminals on the acceleration sensor element 1. Then, the sensor can be constructed readily by placing the acceleration sensor element 1001 on the wiring board 1005.

29th Embodiment

A method for installing weights will be explained in the present embodiment.

Figure 77:
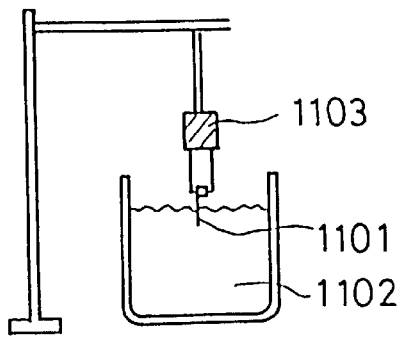
FIG. 77 is an explanatory drawing showing a manufacturing method of the semiconductor acceleration sensor according to a 29th embodiment of the present invention.
Figure 78A:
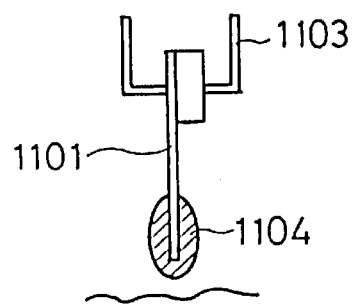
FIGS. 78A–78B are explanatory drawings showing a manufacturing method of the semiconductor acceleration sensor according to the 29th embodiment of the present invention.
Figure 78B:
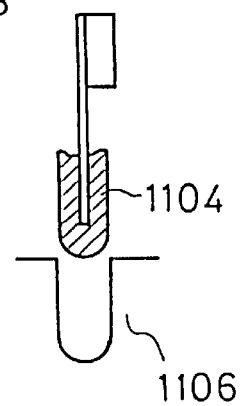

Hitherto, while metal blocks has been stucked to the distal end of an element by an adhesive or the like as a method for installing weights, melt 1102 is provided on the distal end by inserting an acceleration sensor element 1101 to the melt 1102 and drawing it out by a chuck 1103 as shown in FIG. 77. This method allows to readily install a weight 1104 having a homogeneous weight. FIG. 78A is an enlarged view thereof. In FIG. 78B, a container for forming a shape of the weight 1104 is used. A weight having a desired shape could be formed by filling the container with the melt 1102, inserting the sensor element 1101 to a case 1106 and by pulling the element out after the coagulation of the melt.

Figure 79:
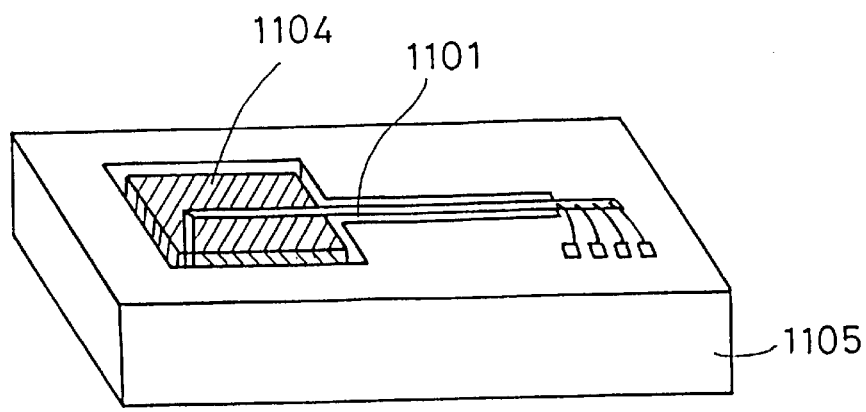
FIG. 79 is an explanatory drawing showing a manufacturing method of the semiconductor acceleration sensor according to the 29th embodiment of the present invention.

In this method, the quality of the weight that it coagulates and contracts is utilized in the prevention of the destruction. This will be explained below. A package case 1105 as shown in FIG. 79 is used to soak a part which will become the weight 1104 into the melt 1102 as shown in FIG. 77 described above. The melt 1102 contracts as it coagulates and creates a gap between the package case. This gap allows the acceleration sensor element 1101 to displace when it receives an acceleration and to block its excessive displacement when it received an excessive acceleration by the package case 1105.

30th Embodiment

Figure 80:
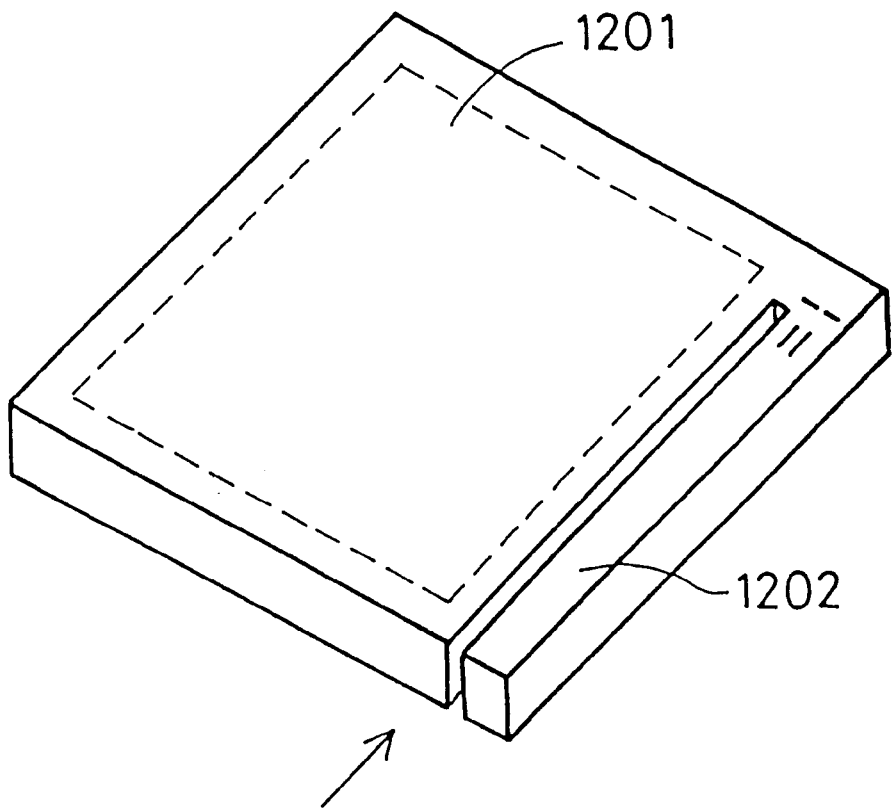
FIG. 80 is an explanatory drawing showing a semiconductor acceleration sensor according to a 30th embodiment of the present invention.

An example of an acceleration sensor attached to a microcomputer chip 1201 will be described in the present embodiment. FIG. 80 shows the present embodiment. While FIG. 80 shows a normal microcomputer chip 1201, an edge of the microcomputer chip is cut out by dicing or the like and is fixed without cutting an end thereof as shown in the figure. This method allows fabrication of the acceleration sensor whose end is fixed. An E$^2$PROM or EPROM including a self-trimming function was used as the microcomputer chip 1201.

The present embodiment allows fabrication of the acceleration sensor including a microcomputer chip readily.

Effects of the Invention

Having being constructed as described above, the present invention has the following effects:

1) Because both the front and back of the semiconductor acceleration sensor having the diffused resistor section are flat and the diffused resistor section is not thinned, the device can be readily made. It requires no cumbersome processes and has a strong shock resistance;

2) Because the thickness results from the thickness of the semiconductor substrate, there is less dispersion of thicknesses and an acceleration sensor having less dispersion of outputs per device can be obtained;

3) It allows to finely adjust readily from outside;

4) It allows to supply high precision devices;

5) Because many acceleration sensor elements can be obtained from a semiconductor substrate, low cost acceleration sensor may be supplied;

6) Because the diffused resistor section requires no thin section, the manufacturing time can be reduced, thus leading to low cost products;

7) Because compression and tensile stresses are detected simultaneously, accurate devices may be supplied; and 8) The biaxial acceleration sensor may be obtained by adjusting the thickness and width of a chip.

As the semiconductor pressure sensor comprises a base having a hollow section whose one side constitutes a diaphragm, a supporter for creating an air-tight chamber within the base, electrical signal outputting means for taking out electrical signals and a sensor element for converting a mechanical deformation into the electrical signals, the sensor element being disposed on the diaphragm and comprising a detection circuit and diffused resistors for detecting a deformation of the diaphragm, the detection circuit of the sensor element comprising a bridge circuit, and the diffused resistors being provided at positions where the diffused resistors are vertical to the diaphragm, the semiconductor pressure sensor has the following effects:

1) Because many pressure sensor elements can be obtained from a semiconductor substrate, low cost pressure sensors may be supplied;

2) Because a pressure detecting section including the diffused resistors and a pressure reference chamber are fabricated separately, the processing step is facilitated, leading to a reduction of the manufacturing cost; and 3) because compression and tensile stresses are detected simultaneously, devices having a good output sensitivity may be supplied.

Stopper

Because the stopper, provided to the supporter, for limiting a displacement of the cantilever has a structure which conforms to a shape of the cantilever which deforms when an acceleration is applied, it has the following effects:

Because the stopper for preventing a destruction relaxes a shock through a contact by the face thereof even if an excessive acceleration is produced, it can prevent the destruction and thus improves the reliability; and Because no buffer such as silicon oil is necessary, the manufacturing cost of the semiconductor acceleration sensor may be reduced.

Diffused Resistors are Installed Facing to Supporting Substrate

The following effects may be obtained by fixing the cantilever and the supporter so that the side of the diffused resistor is fixed to the supporter:

The manufacturing cost may be lowered and the shock resistance can be enhanced; and Because the electrical circuit including the diffused resistors is facing to the substrate having the supporting and wiring functions, electrical signals may be readily taken out.

What is claimed is:

1. A semiconductor device comprising: a semiconductor acceleration sensor having a column-shaped cantilever, a supporter for supporting the cantilever and a plurality of diffused resistors disposed on the cantilever for detecting stress; wherein the cantilever has a first main surface, a second main surface disposed opposite to the first main surface, and a plurality of side surfaces disposed generally perpendicular to the first and second main surfaces, the diffused resistors being disposed on one of the side surfaces of the cantilever.

2. A semiconductor device comprising: a semiconductor acceleration sensor having a rectangular parallelepiped-shaped cantilever, a supporter connected to a first surface of the cantilever for supporting the cantilever, and at least one diffused resistor disposed on a second surface of the cantilever disposed generally perpendicular to the first surface for detecting stresses of the cantilever caused by an acceleration applied to the cantilever.

3. A semiconductor device according to claim 2; wherein the cantilever has a diffused resistor section defining the second surface of the cantilever having the diffused resistors, and remaining sections which do not have diffused resistors, the diffused resistor section having a thickness equal to the remaining sections of the cantilever.

4. A semiconductor device according to claim 2; further comprising a polymeric material integrally connecting the supporter to the cantilever.

5. A semiconductor device according to claim 2; further comprising a metallic material integrally connecting the supporter to the cantilever.

6. A semiconductor device according to claim 2; further comprising mechanical means for integrally connecting the supporter to the cantilever.

7. A semiconductor device according to claim 2; wherein the cantilever is connected to the supporter by an anodic bond.

8. A semiconductor device according to claim 2; wherein the cantilever has an electrical circuit having a CMOS structure.

9. A semiconductor device according to claim 2; wherein the cantilever has a temperature compensating circuit.

10. A semiconductor device according to claim 2; wherein the cantilever has an amplifier circuit.

11. A semiconductor device according to claim 2; wherein the cantilever has resistors for regulating an output voltage.

12. A semiconductor device according to claim 2; further comprising weights disposed on the cantilever.

13. A semiconductor device comprising: a semiconductor acceleration sensor having a semiconductor element, a supporting base connected to a first surface of the semiconductor element, and at least one diffused resistor disposed on a second surface of the semiconductor element for detecting stress of the semiconductor element caused by an acceleration applied to the semiconductor element, the first surface being disposed generally perpendicular to the second surface; a terminal base connected to the supporting base; and a glass tube connected to the terminal base and enclosing the semiconductor element.

14. A semiconductor device comprising: a semiconductor acceleration sensor having a cantilever, a diffused resistor section disposed on a first surface of the cantilever, and a supporter connected to a second surface of the cantilever disposed generally perpendicular to the first surface for supporting the cantilever, the supporter having a region for detecting an acceleration on the side of the cantilever, the region of the supporter extending parallel to the direction of the acceleration to be detected.

15. A semiconductor device according to claim 14; wherein the diffused resistor section comprises a first diffused resistor in the vicinity of a top surface of the cantilever and a second diffused resistor in the vicinity of a bottom surface of the cantilever, the first diffused resistor and the second diffused resistor comprising a bridge circuit for detecting a compression stress and a tensile stress of the cantilever caused by an acceleration applied to the cantilever.

16. A semiconductor device comprising: a semiconductor acceleration sensor having a cantilever having a uniform thickness, a supporter connected to a first surface of the cantilever for supporting the cantilever, a plurality of diffused resistors disposed on a second surface of the cantilever generally perpendicular to the first surface for detecting an acceleration, and output pad sections arranged in a row for outputting electrical signals indicative of the acceleration detected by the diffused resistors.

17. A semiconductor device comprising: a semiconductor acceleration sensor having a cantilever made of a semiconductor material, a supporter connected to a first surface of the cantilever for supporting the cantilever, diffused resistors provided on a second surface of the cantilever disposed generally perpendicular to the first surface, acceleration detecting means for detecting a displacement of the cantilever based on an applied acceleration and changes of resistance values of the diffused resistors, and stoppers connected to the supporter for limiting the displacement of the cantilever, the stoppers conforming to an outer shape of the cantilever when the cantilever is displaced.

18. A semiconductor device according to claim 17; wherein each of the stoppers has a surface facing the cantilever, the surface of each of the stoppers having a curvature in conformance with a deflection curve of the cantilever.

19. A semiconductor device comprising: a column-shaped silicon semiconductor substrate; a supporter connected to a first surface of the silicon semiconductor substrate for supporting the silicon semiconductor substrate at one end thereof; connecting means for connecting the first surface of the silicon semiconductor substrate to the supporter; a plurality of diffused resistors provided on a second surface of the silicon semiconductor substrate disposed generally perpendicular to the first surface thereof; detecting means for detecting a displacement of the silicon semiconductor substrate due to an acceleration force applied to the silicon semiconductor substrate and changes of resistance values of the diffused resistors and for converting the detected displacement to an electrical signal; and electrical signal connecting means for transmitting the electrical signal converted by the detecting means to the exterior of the semiconductor device.

20. A semiconductor device according to claim 19; wherein the cantilever has a uniform thickness.

21. A semiconductor device according to claim 20; wherein the detecting means comprises an electrical circuit disposed in the cantilever, the electrical circuit having a CMOS structure.

22. A semiconductor device according to claim 20; wherein the cantilever has a temperature compensating circuit.

23. A semiconductor device according to claim 20; further comprising weights disposed at a free end of the cantilever.

24. A semiconductor device according to claim 1; wherein the plurality of diffused resistors comprise a first diffused resistor disposed in the vicinity of the first main surface of the cantilever, and a second diffused resistor disposed in the vicinity of the second main surface of the cantilever.

25. A semiconductor device according to claim 24; wherein the first and second diffused resistors comprise a bridge circuit for detecting a compression stress and a tensile stress of the cantilever caused by an acceleration applied to the cantilever.

26. A semiconductor device according to claim 1; wherein the cantilever has a diffused resistor section defining a portion of the side surface of the cantilever having the diffused resistors, and remaining sections which do not have diffused resistors, the diffused resistor section having a thickness equal to the remaining sections of the cantilever.

27. A semiconductor device according to claim 13; wherein the semiconductor element has a uniform thickness.

28. A semiconductor device according to claim 13; wherein the semiconductor element is generally rectangular parallelepiped-shaped.

29. A semiconductor device according to claim 28; wherein the semiconductor element is generally column-shaped.

30. A semiconductor device according to claim 14; wherein the cantilever has a uniform thickness.

31. A semiconductor device according to claim 14; wherein the cantilever is generally column-shaped.

32. A semiconductor device comprising: a semiconductor acceleration sensor having a cantilever having a first surface and a second surface disposed generally perpendicular to the first surface, a supporter connected to the first surface of the cantilever for supporting the cantilever, and a diffused resistor section having diffused resistors disposed on the second surface of the cantilever for detecting stress.

33. A semiconductor device according to claim 32; wherein the cantilever has a third surface disposed opposite and generally parallel to the first surface; and wherein the diffused resistors comprise at least one first diffused resistor disposed in the vicinity of the first surface of the cantilever, and at least one second diffused resistor disposed in the vicinity of the third surface of the cantilever.

34. A semiconductor device according to claim 33; wherein the first and second diffused resistors comprise a bridge circuit for detecting a compression stress and a tensile stress of the cantilever caused by an acceleration applied to the cantilever.

35. A semiconductor device according to claim 32; wherein sections of the cantilever, other than the diffused resistor section, which do not have diffused resistors, have a thickness equal to the diffused resistor section.

\* \* \* \* \*